US009661184B2

(12) United States Patent
Ogawa

(10) Patent No.: US 9,661,184 B2
(45) Date of Patent: May 23, 2017

(54) DATA PROCESSING SYSTEM AND DATA PROCESSING METHOD FOR AUTHENTICATING USER BY UTILIZING USER LIST OBTAINED FROM SERVICE PROVIDING APPARATUS

(71) Applicant: Minami Ogawa, Tokyo (JP)

(72) Inventor: Minami Ogawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/870,149

(22) Filed: Sep. 30, 2015

(65) Prior Publication Data

US 2016/0127610 A1     May 5, 2016

(30) Foreign Application Priority Data

Oct. 31, 2014   (JP) ................................ 2014-223518

(51) Int. Cl.
| | |
|---|---|
| *G06F 3/12* | (2006.01) |
| *H04N 1/44* | (2006.01) |
| *H04N 1/00* | (2006.01) |
| *H04N 1/32* | (2006.01) |

(52) U.S. Cl.
CPC ....... *H04N 1/4413* (2013.01); *H04N 1/00204* (2013.01); *H04N 1/00413* (2013.01); *H04N 1/00514* (2013.01); *H04N 1/32101* (2013.01); *H04N 1/4433* (2013.01); *H04N 2201/0094* (2013.01)

(58) Field of Classification Search
CPC . H04N 1/4413; H04N 1/4433; H04N 1/00514
See application file for complete search history.

(56) References Cited

U.S. PATENT DOCUMENTS

| | | | | |
|---|---|---|---|---|
| 6,539,481 | B1 * | 3/2003 | Takahashi | ............... G06F 21/31 |
| | | | | 709/223 |
| 2005/0273843 | A1 * | 12/2005 | Shigeeda | ............ H04L 63/0807 |
| | | | | 726/5 |
| 2007/0236730 | A1 | 10/2007 | Takeuchi et al. | |

(Continued)

FOREIGN PATENT DOCUMENTS

| | | |
|---|---|---|
| EP | 2216723 | 8/2010 |
| JP | 2005-032071 | 2/2005 |

(Continued)

*Primary Examiner* — Benjamin O Dulaney
(74) *Attorney, Agent, or Firm* — IPUSA, PLLC

(57) ABSTRACT

A data processing system includes a data processing apparatus providing a service to a service using apparatus and the service using apparatus that includes an authentication requesting unit that requests the data processing apparatus to authenticate the user by user specifying data input via an input screen, an obtaining unit that obtains, when the user is successfully authenticated, association data associated with the user specifying data from the data processing apparatus to store in a storage unit, and an accepting unit that displays, when the association data is stored in the storage unit, a user list of users specified from the association data in the input screen, reads out, upon a selection of a user from the user list, a part of the user specifying data from the association data corresponding to the selected user, and accepts an input of information except the read out part from the input screen.

8 Claims, 19 Drawing Sheets

(56) References Cited

U.S. PATENT DOCUMENTS

| | | | | |
|---|---|---|---|---|
| 2008/0104594 A1* | 5/2008 | Funane | ............... | G06Q 10/06 718/100 |
| 2008/0114903 A1* | 5/2008 | Tadokoro | ............ | G06F 21/33 710/8 |
| 2010/0064256 A1* | 3/2010 | Esaki | ............... | H04N 1/00413 715/825 |
| 2011/0126270 A1* | 5/2011 | Sato | ............... | G06F 21/31 726/4 |
| 2012/0229835 A1* | 9/2012 | Tawada | ............ | H04N 1/4433 358/1.13 |
| 2013/0201514 A1* | 8/2013 | Terao | ............... | H04N 1/00514 358/1.14 |
| 2015/0143193 A1* | 5/2015 | Kasahara | ............ | H04L 1/08 714/748 |

FOREIGN PATENT DOCUMENTS

| | | |
|---|---|---|
| JP | 2007-279974 | 10/2007 |
| JP | 2010-186264 | 8/2010 |
| JP | 2014-026333 | 2/2014 |
| WO | 2014/017058 | 1/2014 |

\* cited by examiner

| TENANT ID | LICENSE | |
|---|---|---|
| 600000000 | translate | YES |
| | signage | NO |
| 600000001 | translate | NO |
| | signage | YES |

FIG.7

| MAIL ADDRESS | TENANT ID | USER NAME | AUTHORITY OF SERVICE UTILIZATION | |
|---|---|---|---|---|
| taro_yamada@example.com | 600000000 | TARO YAMADA | translate | YES |
| hanako_tanaka@example.com | 600000000 | HANAKO TANAKA | translate | YES |
| ichiro_riko@example.com | 600000000 | ICHIRO RIKO | translate | YES |
| jiro_sato@example.com | 600000000 | JIRO SATO | translate | NO |
| saburo_suzuki@example.com | 600000001 | SABURO SUZUKI | signage | YES |

FIG.8

| SERVICE CLASS |
|---|
| translate |
| signage |

FIG.12C

LOG-IN

INPUT MAIL ADDRESS AND PASSWORD.

240 { MAIL ADDRESS [　　　　　]
PASSWORD [　　　　　]

LOG-IN FROM USER LIST　|ADD ACCOUNT|　|LOG-IN|
　　　　　241　　　　　　　　243　　　　　　242

| # | USER NAME | MAIL ADDRESS |
|---|---|---|
| 0 | TARO YAMADA | taro_yamada@example.com |
| 1 | HANAKO TANAKA | hanako_tanaka@example.com |
| 2 | ICHIRO RIKO | ichiro_riko@example.com |

DATA PROCESSING SYSTEM AND DATA PROCESSING METHOD FOR AUTHENTICATING USER BY UTILIZING USER LIST OBTAINED FROM SERVICE PROVIDING APPARATUS

BACKGROUND OF THE INVENTION

1. Field of the Invention

The present invention relates to a data processing system and a data processing method.

2. Description of the Related Art

Recently, service providing configurations have been increased in which a user only uses a necessary function only when it is necessary. For example, such configurations include a software using configuration called Software as a Service (SaaS) in which a user arbitrarily selects only a desired function and uses the service, a combination of computing resources on the INTERNET, a cloud computing that provides a service with a high added value to end users or the like.

In order to provide a customized screen to a user of the above described service, a method is known in which a screen is generated using specific screen definition data that is associated with client identifier (see Patent Document 1, for example).

However, the above described method of Patent Document 1 is not related to log in to a cloud service by a user. For example, a user needs to input authentication data necessary for log-in on a screen when logging in to the cloud service. Thus, there has been a problem that time and efforts are necessary when inputting authentication data on a small screen such as an operation panel or the like, for example.

PATENT DOCUMENT

[Patent Document 1] Japanese Laid-open Patent Publication No. 2010-186264

SUMMARY OF THE INVENTION

The present invention is made in light of the above problems, and provides a method of simplifying inputting data used for authentication.

According to an embodiment, there is provided a data processing system including a service using apparatus; and a data processing apparatus that provides a service to the service using apparatus, wherein the service using apparatus includes an authentication requesting unit that requests, based on a request to authenticate from a user accepted via an input screen, the data processing apparatus to authenticate the user by user specifying data input via the input screen, an obtaining unit that obtains, when the user is successfully authenticated by the data processing apparatus, association data associated with the user specifying data from the data processing apparatus to cause a storage unit stores the association data, and an accepting unit that, when displaying the input screen, displays, when the association data is stored in the storage unit, a user list of users specified from the association data in the input screen, reads out, upon a selection of a user from the displayed user list, a part of the user specifying data from the association data corresponding to the selected user, and accepts an input of information except the read out part from the input screen.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 7 is a view illustrating an example of user data of the embodiment;

FIG. 8 is a view illustrating an example of service data of the embodiment;

FIG. 12A to FIG. 12C are views illustrating an example of a log-in screen using a user list;

FIG. 13 is a view illustrating an example of data of a user list stored in a data storage unit;

DETAILED DESCRIPTION OF THE PREFERRED EMBODIMENTS

Figure 1:
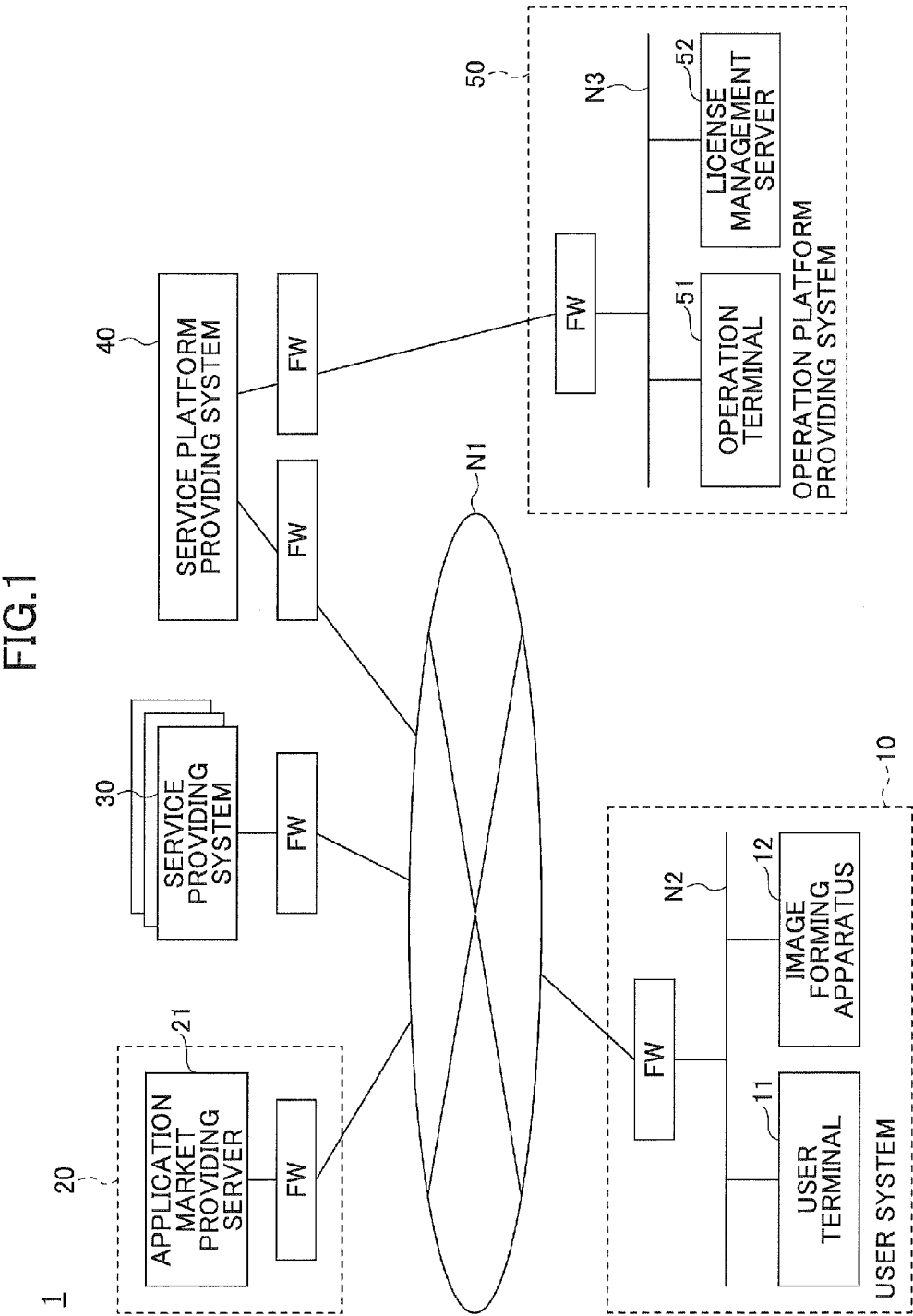
FIG. 1 is a view illustrating an example of a structure of a data processing system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(System Structure)

FIG. 1 is a view illustrating an example of a structure of a data processing system 1 of the embodiment. The data processing system 1 illustrated in FIG. 1 includes a user system 10, an application market providing system 20, a service providing system 30, a service platform providing system 40 and an operation platform providing system 50.

The user system 10, the application market providing system 20, the service providing system 30 and the service platform providing system 40 are connected with each other via a network N1 such as the INTERNET or the like. The service platform providing system 40 and the operation platform providing system 50 are connected via a private line or the like.

The user system 10 includes an image forming apparatus 12 such as a multifunction peripheral or the like, a user terminal 11, a network N2 and the like.

The network N2 is a private network and a firewall FW is provided between the network N2 and the network N1. The firewall FW detects and closes an unauthorized access. The image forming apparatus 12, the user terminal 11 and the like are connected to the network N2. The image forming apparatus 12 is an example of an electronic device by which a user experimentally or actually uses a service.

The user terminal 11 may be actualized by a data processing apparatus on which a general Operating System (OS) or the like is mounted. The user terminal 11 includes a wireless communication means or a wired communication means. The user terminal 11 may be a terminal operable by a user such as a smartphone, a mobile phone, a tablet terminal, a Personal Computer (PC) or the like.

The image forming apparatus 12 is an apparatus that has an image forming function such as a multifunction peripheral or the like. The image forming apparatus 12 includes a wireless communication means or a wired communication means. The image forming apparatus 12 is an apparatus that performs a process regarding an image formation and on which a browser is mounted such as a multifunction peripheral, a copying machine, a scanner, a printer, a laser printer, a projector, an electronic whiteboard or the like, for example. Although an example is illustrated in FIG. 1 in which the user system 10 includes one user terminal 11 and one image forming apparatus 12, the user system 10 may include a plurality of them.

The application market providing system 20 includes an application market providing server 21. The application market providing server 21 is connected to the network N1 via a firewall FW. The application market providing server 21 may be actualized by one or more data processing apparatuses on each of which a general OS or the like is mounted.

The application market providing system 20 may be provided for each sales territory, each sales company or the like. The application market providing server 21 provides an application market screen such as a service list screen, an applying screen or the like to the user terminal 11 or the image forming apparatus 12, for example.

The service providing system 30 is connected to the network N1 via a firewall FW. The service providing system 30 provides various services to the user terminal 11 or the image forming apparatus 12. The service providing system 30 may be actualized by one or more data processing apparatuses on each of which a general OS or the like is mounted.

The services provided by the service providing system 30 may be services provided external service providers or the like, in addition to services provided by an administrator of the service platform providing system 40. The services provided by the service providing system 30 is a translation service or the like, for example. When using the translation service, a user of the image forming apparatus 12 may scan a manuscript to obtain an image data or the like, perform an OCR (optical character recognition) process on the obtained image data and send it to the service providing system 30. Then, the user may view a translated result by accessing the service providing system 30 via the user terminal 11, or may receive a translated result by an electronic mail or the like.

The service platform providing system 40 is connected to the network N1 via a firewall FW. The service platform providing system 40 may be actualized by one or more data processing apparatuses on each of which a general OS or the like is mounted.

The service platform providing system 40 has functions such as an authentication•permission function, a tenant•user management function, a license management function, an account registration function or the like, for example. The service platform providing system 40 receives a request to register an account or a request to log in from the user terminal 11 or the image forming apparatus 12. The service platform providing system 40 also receives a request to confirm an authentication ticket or request to obtain user data from the service providing system 30.

The operation platform providing system 50 includes an operation terminal 51, a license management server 52 and the network N3. The network N3 is a private network and a firewall FW is provided between the network N3 and the network N1. The operation terminal 51 and the license management server 52 are connected to the network N3. Each of the operation terminal 51 and the license management server 52 may be actualized by one or more data processing apparatuses on each of which a general OS or the like is mounted.

The operation terminal 51 includes a wireless communication means or a wired communication means. The operation terminal 51 may be a terminal operable by a work operator such as a smartphone, a mobile phone, a tablet terminal, a PC or the like. The work operator is capable of requesting issuance of a license from the operation terminal 51 to the license management server 52.

The license management server 52 has a function to manage licenses or the like. The license management server 52 receives a request of issuance of a license or the like from the service platform providing system 40 or the operation terminal 51. The structure of the data processing system 1 illustrated in FIG. 1 is just an example and the data processing system 1 may have another structure.

(Hardware Structure of Computer)

Figure 2:
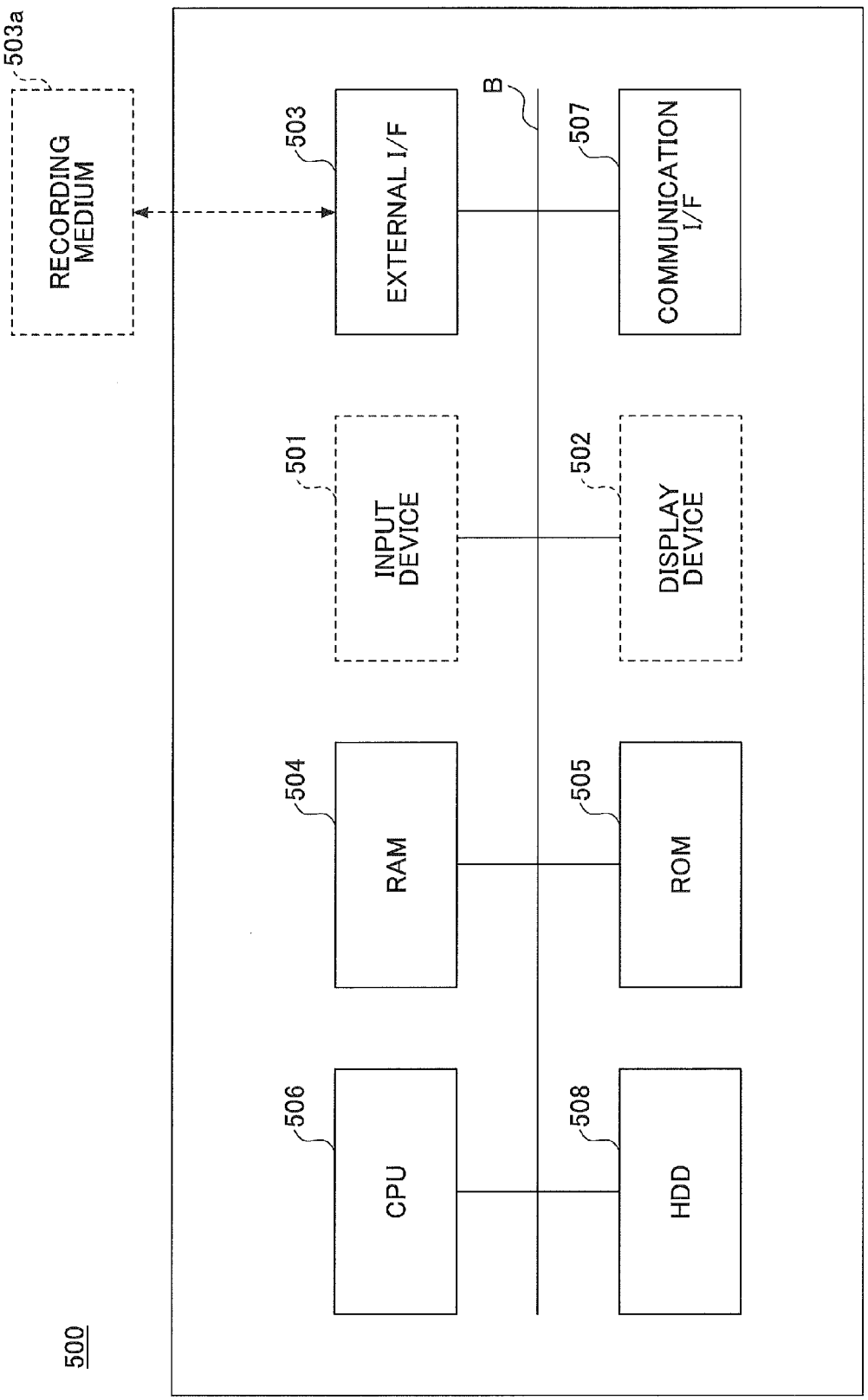
FIG. 2 is a view illustrating an example of a hardware structure of a computer of the embodiment.

FIG. 2 is a view illustrating an example of a hardware structure of a computer of the embodiment. Each of the user terminal 11, the application market providing server 21, the operation terminal 51 and the license management server 52 illustrated in FIG. 1 is actualized by a computer having a hardware structure as illustrated in FIG. 2, for example. Further, the data processing apparatus that actualizes each of the service providing system 30 and the service platform providing system 40 as illustrated in FIG. 1 is actualized by the computer having the hardware structure as illustrated in FIG. 2, for example.

The computer 500 illustrated in FIG. 2 includes an input device 501, a display device 502, an external I/F 503, a RAM (Random Access Memory) 504, a ROM (Read Only Memory) 505, a CPU (Central Processing Unit) 506, a communication I/F 507, a HDD (Hard Disk Drive) 508 and the like, and each of them is connected with each other via a bus B. The input device 501 and the display device 502 may be connected only when it is necessary.

The input device 501 includes a keyboard, a mouse or the like, and is used by a user to input various operation signals. The display device 502 includes a display or the like and displays a processed result by the computer 500.

The external I/F 503 is an interface for an external device. As the external device, a recording medium 503a or the like may be raised. With this configuration, the computer 500 can read and/or write data from and on the recording medium 503a via the external I/F 503. As the recording medium 503a, a flexible disk, a Compact Disk (CD), a Digital Versatile Disk (DVD), an SD Memory card, a Universal Serial Bus memory (USB memory) or the like may be raised.

The RAM 504 is a volatile semiconductor memory (storage device) that temporarily stores programs and data. The ROM 505 is a non-volatile semiconductor memory (storage device) that can store programs and data even when the switch is turned off. The ROM 505 stores programs and data such as a Basic Input/Output System (BIOS) that is executed when activating the computer 500, an OS setting, a network setting or the like.

The CPU 506 is an arithmetic unit that actualizes control and functions of the entirety of the computer 500 by reading out programs or data from the storage device such as the ROM 505, the HDD 508 or the like on the RAM 504 and executing the processes.

The communication I/F 507 is an interface that connects the computer 500 to the network N1, N2 or N3. With this configuration, the computer 500 can perform data communication via the communication I/F 507.

The HDD 508 is a non-volatile storage device that stores programs or data. The programs or data stored in the HDD 508 include an OS that is basic software for controlling the entirety of the computer 500, application software that provides various functions on the OS or the like, for example. Here, the computer 500 may include a Solid State Drive (SSD) instead of the HDD 55.

Each of the user terminal 11, the application market providing server 21, the operation terminal 51 and the license management server 52 of the embodiment is capable of actualizing the various processes, which will be explained later, by the hardware structure of the computer 500. Further, the data processing apparatus that actualizes each of the service providing system 30 and the service platform providing system 40 of the embodiment is capable of actualizing the various processes, which will be explained later, by the hardware structure of the computer 500.

(Hardware Structure of Image Forming Apparatus)

Figure 3:
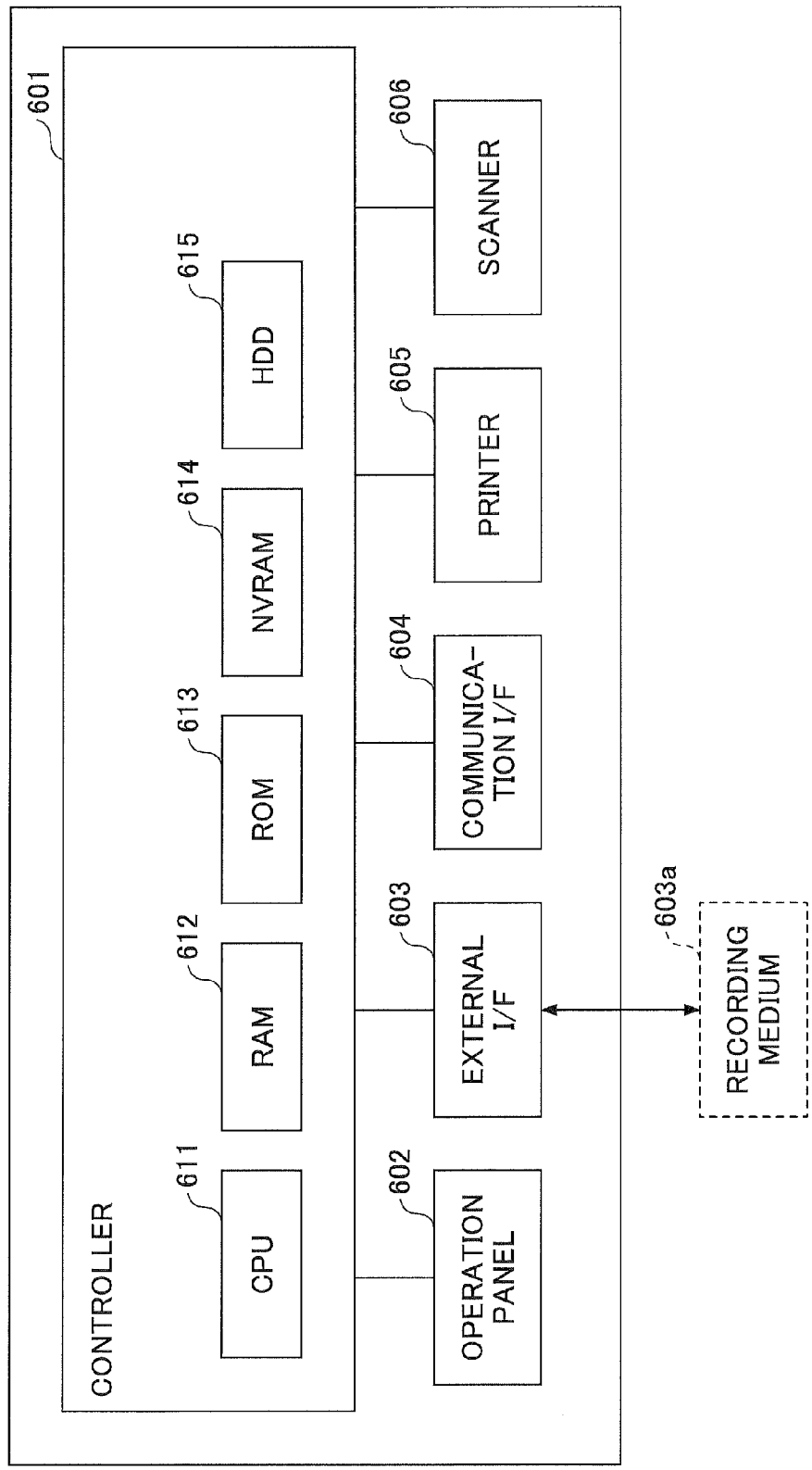
FIG. 3 is a view illustrating an example of a hardware structure of an image forming apparatus of the embodiment.

FIG. 3 is a view illustrating an example of a hardware structure of the image forming apparatus 12 of the embodiment. The image forming apparatus 12 illustrated in FIG. 1 is actualized by a computer having a hardware structure as illustrated in FIG. 3, for example. The image forming apparatus 12 illustrated in FIG. 3 includes a controller 601, an operation panel 602, an external I/F 603, a communication I/F 604, a printer 605, a scanner 606 and the like.

The controller 601 includes a CPU 611, a RAM 612, a ROM 613, a NVRAM 614, a HDD 615 and the like. The ROM 613 stores various programs and data. The RAM 612 temporarily stores programs or data. The NVRAM 614 stores setting data or the like, for example. The HDD 615 stores various programs and data.

The CPU 611 actualizes control and functions of the entirety of the image forming apparatus 12 by reading out programs, data, setting data or the like from the ROM 613, the NVRAM 614, the HDD 615 or the like on the RAM 612 and executing the processes.

The operation panel 602 includes an input unit that receives input from a user and a display unit that displays data. The external I/F 603 is an interface for an external device. As the external device, a recording medium 603a or the like may be raised. With this configuration, the image forming apparatus 12 can read and/or write data from and on the recording medium 603a via the external I/F 603. As the recording medium 603a, an IC card, a flexible disk, a CD, a DVD, an SD memory card, a USB memory or the like may be raised.

The communication I/F 604 is an interface that connects the image forming apparatus 12 to the network N2. With this configuration, the image forming apparatus 12 can perform data communication via the communication I/F 604. The printer 605 is a printing device that prints print data on a paper. The scanner 606 is a reading device that reads image data (electronic data) from a manuscript. As each of the firewalls FW illustrated in FIG. 1 has a general function of a firewall, an explanation of a hardware structure for each of the firewalls FW illustrated in FIG. 1 is omitted.

(Service Platform Providing System)

Figure 4:
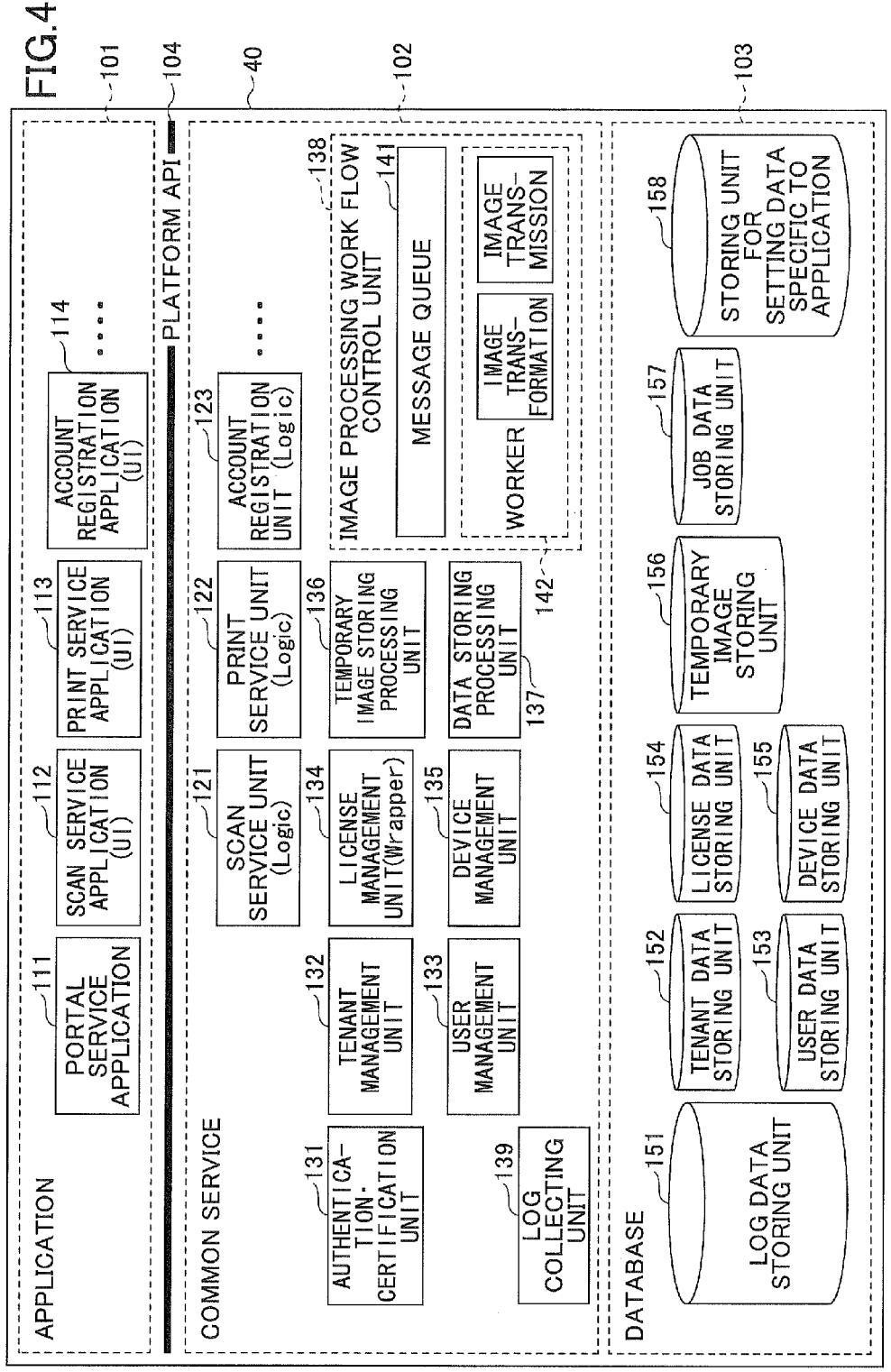
FIG. 4 is a process block diagram illustrating an example of a service platform providing system.

The service platform providing system 40 of the embodiment is actualized by a process block as illustrated in FIG. 4, for example. FIG. 4 is a process block diagram illustrating an example of the service platform providing system 40 of the embodiment. The service platform providing system 40 actualizes the process block as illustrated in FIG. 4 by executing a program.

The service platform providing system 40 illustrated in FIG. 4 actualizes application 101, a common service 102, a database (DB) 103 and a platform Application Programming Interface (API) 104.

The application 101 includes portal service application 111, scan service application 112, print service application 113 and account registration application 114, as an example.

The portal service application 111 is application that provides a portal service. The portal service provides a service that becomes an entrance to use the data processing system 1. The scan service application 112 is a UI (user interface) of application that provides a scan service.

The print service application 113 is a UI of application that provides a print service. The account registration application 114 is a UI of application that provides an account registration service. The application 101 may include another service application.

The UI of each of the scan service application 112, the print service application 113 and the account registration application 114 may include Native application or HTML/JavaScript (registered trademark) data that is displayed or executed at the user terminal 11 or the image forming apparatus 12. The Native application counterparts Web application, and is a type of application whose main process is performed by the user terminal 11 or the image forming apparatus 12. The Web application is a type of application whose main process is performed by the service platform providing system 40.

The platform API 104 is an interface for the application 101 such as the portal service application 111 or the like to use the common service 102.

The platform API 104 is a previously defined interface provided for the common service 102 to receive a request from the application 101, and is configured by a function, a class or the like, for example. When the service platform providing system 40 is configured by a plurality of data processing apparatuses, the platform API 104 can be actualized by a Web API that can be usable via a network, for example.

The common service 102 includes a scan service unit 121, a print service unit 122, an account registration unit 123, an authentication•certification unit 131, a tenant management unit 132, a user management unit 133, a license management unit 134, a device management unit 135, a temporary image storing processing unit 136, a data storing processing unit 137, an image processing work flow control unit 138 and a log collecting unit 139. The image processing work flow control unit 138 includes a message queue 141 and one or more workers 142. The workers 142 actualize functions such as image transformation, image transmission and the like.

The database 103 includes a log data storing unit 151, a tenant data storing unit 152, a user data storing unit 153, a license data storing unit 154, a device data storing unit 155, a temporary image storing unit 156, a job data storing unit 157 and a storing unit 158 for setting data specific to application (hereinafter, referred to as "setting data storing unit 158").

The scan service unit 121 functions as a logic (API) of the scan service application 112. The print service unit 122 functions as a logic (API) of the print service application 113. The account registration unit 123 functions as a logic (APT) of the account registration application 114.

The authentication•certification unit 131 authenticates and certificates based on a request to log in from the office device such as the user terminal 11, the image forming apparatus 12 or the like. The office device is a generic name of the user terminal 11, the image forming apparatus 12 and the like.

The authentication•certification unit 131 authenticates and certificates a user by accessing the user data storing unit 153, the license data storing unit 154 or the like, for example. Further, the authentication•certification unit 131 authenticates the image forming apparatus 12 or the like as a client by accessing the tenant data storing unit 152, the license data storing unit 154, the device data storing unit 155 or the like, for example.

The tenant management unit 132 manages tenant data stored in the tenant data storing unit 152. The user management unit 133 manages user data stored in the user data storing unit 153.

The license management unit 134 manages license data stored in the license data storing unit 154. The device management unit 135 manages device data stored in the device data storing unit 155. The temporary image storing processing unit 136 stores a temporary image in the temporary image storing unit 156 and obtains the temporary image from the temporary image storing unit 156. The data storing processing unit 137 stores data in the job data storing unit 157 or the like.

The image processing work flow control unit 138 controls a work flow regarding image processing based on a request from the application 101. The message queue 141 includes a queue that corresponds to a kind of a process. The image processing work flow control unit 138 inputs a message of a request regarding a process (job) to a queue that corresponds to a kind of the job.

The workers 142 monitor corresponding queues, respectively. Then, when a message is input in the respective queue, the worker 142 performs a process such as image transformation, image transmission or the like that corresponds to a kind of the respective job. The message input in the queue may be mainly read out by the worker 142 (Pull), or the queue may provide the message to the worker 142 (Push). The log collecting unit 139 stores collected log data in the log data storing unit 151, for example.

The log data storing unit 151 stores log data. The tenant data storing unit 152 stores tenant data. The user data storing unit 153 stores user data. The license data storing unit 154 stores license data. The device data storing unit 155 stores device data. The temporary image storing unit 156 stores a temporary image. The temporary image is a file or data such as a scan image or the like processed by the worker 142, for example.

The job data storing unit 157 stores information of request (job data) regarding the process (job). The setting data storing unit 158 stores setting data specific to the application 101.

The service platform providing system 40 functions as an integrated base that provides a common service such as authentication•certification, a work flow regarding image processing or the like, and a service group that provides application services such as a scan service, a print service and the like using a function of the integrated base.

The integrated base is configured by the common service 102, the database 103 and the platform API 104, for example. The service group is configured by the application 101, for example. As such, the service platform providing system 40 illustrated in FIG. 4 has a structure in which the service group and the integrated base are separated.

As the service platform providing system 40 illustrated in FIG. 4 has the structure in which the service group and the integrated base are separated, it is easy to develop the application 101 that uses the platform API 104. Further, with the service platform providing system 40 illustrated in FIG. 4, it is easy to develop the service providing system 30 that uses the platform API 104.

Here, the embodiment of classification of the process block of the service platform providing system 40 illustrated in FIG. 4 is just an example, and it is not essential to classify the application 101, the common service 102 and the database 103 by layers as illustrated in FIG. 4. For example, as long as it is possible to perform the processes of the service platform providing system 40, a layer relationship or the like illustrated in FIG. 4 is not limited to a specific structure.

(Process Block of Image Forming Apparatus 12)

Figures 5, 6:
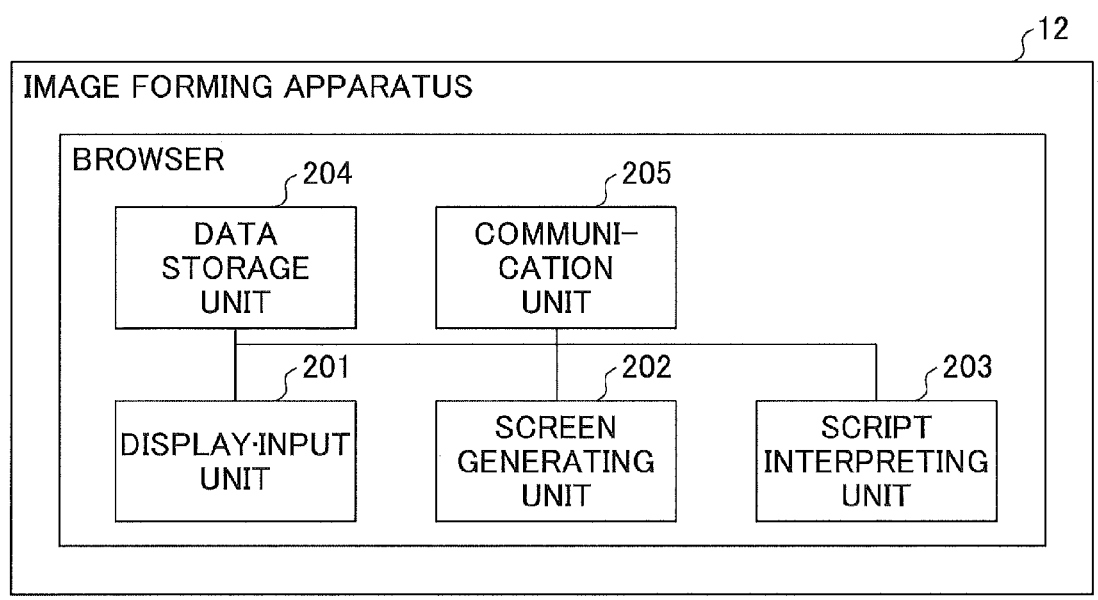
FIG. 5 is a process block diagram illustrating an example of the image forming apparatus of the embodiment.
FIG. 6 is a view illustrating an example of tenant data of the embodiment.

The image forming apparatus 12 is actualized by a functional structure illustrated in FIG. 5, for example. FIG. 5 is a process block diagram illustrating an example of the image forming apparatus 12 of the embodiment. A browser of the image forming apparatus 12 illustrated in FIG. 5 includes a display•input unit 201, a screen generating unit 202, a script interpreting unit 203, a data storage unit 204 and a communication unit 205, for example.

The display•input unit 201 accepts an input instruction by an operation from a user via the operation panel or the like, and displays a log-in screen or the like that is generated by the screen generating unit 202 on the operation panel.

The screen generating unit 202 performs a rendering process on an HTML file or the like obtained from the service platform providing system 40 via the communication unit 205. The screen generating unit 202 generates the log-in screen or the like based on JavaScript data analyzed by the script interpreting unit 203.

The script interpreting unit 203 analyzes JavaScript or the like obtained from the service platform providing system 40 via the communication unit 205, for example. The data storage unit 204 is configured by a local storage, a session storage or the like, for example, and stores HTML/JavaScript data or the like obtained from the service platform providing system 40 via the communication unit 205.

The communication unit 205 sends a request to log in to the service platform providing system 40 and obtains various files from the service platform providing system 40.

(Example of Tenant Data)

Next, an example of the tenant data stored in the tenant data storing unit 152 or the like of the service platform providing system 40 is explained. FIG. 6 is a view illustrating an example of the tenant data of the embodiment.

Although the tenant data illustrated in FIG. 6 includes data items such as "tenant ID", "license" and the like, for example, this is not limited so. The "tenant ID" is data that specifies a group (organization) such as a company, a department or the like. The "tenant ID" is not limited to an idiom "tenant" and may be tenant data that identifies a contract, for example. The "tenant ID" is uniquely provided.

The "license" is data that indicates whether a license is issued for each of the services for the respective tenant ID. For the example of FIG. 6, it is illustrated whether a license is issued for each of the services such as "translate (translation service)", "signage" or the like.

For the example of FIG. 6, it is illustrated that a license is issued for a "translate" service is issued but a license is not issued for a "signage" service for the tenant ID "600000000".

(Example of User Data)

Next, an example of the user data stored in the user data storing unit 153 or the like of the service platform providing system 40 is explained. FIG. 7 is a view illustrating an example of the user data of the embodiment.

Although the user data illustrated in FIG. 7 includes data items such as "mail address", "tenant ID", "user name", "authority of service utilization" and the like, for example, this is not limited so. The "mail address" is data of a mail address for log-in that is set to correspond to a user name, for example. The "tenant ID" corresponds to the "tenant ID" illustrated in FIG. 6. The "user name" indicates a name of the user.

The "authority of service utilization" is data that indicates whether the respective user has an authority of utilization for a service, for example.

For the example of FIG. 7, a user whose user name is "Taro Yamada" belongs to the tenant ID "600000000" and is capable of logging in by a mail address "taro_yamada@example.com". Further, the user whose user name is "Taro Yamada" has an authority of service utilization for "translate".

(Example of Service Class)

Next, an example of a service class that is set in association with the tenant data or the user data is explained. FIG. 8 is a view illustrating an example of service data of the embodiment.

Although the service data illustrated in FIG. 8 includes data items such as "service class" and the like, for example, this is not limited so. The "service class" is data that specifies a service such as "translate (translation service)", "signage" or the like.

(Sequence for Logging In)

Figure 9:
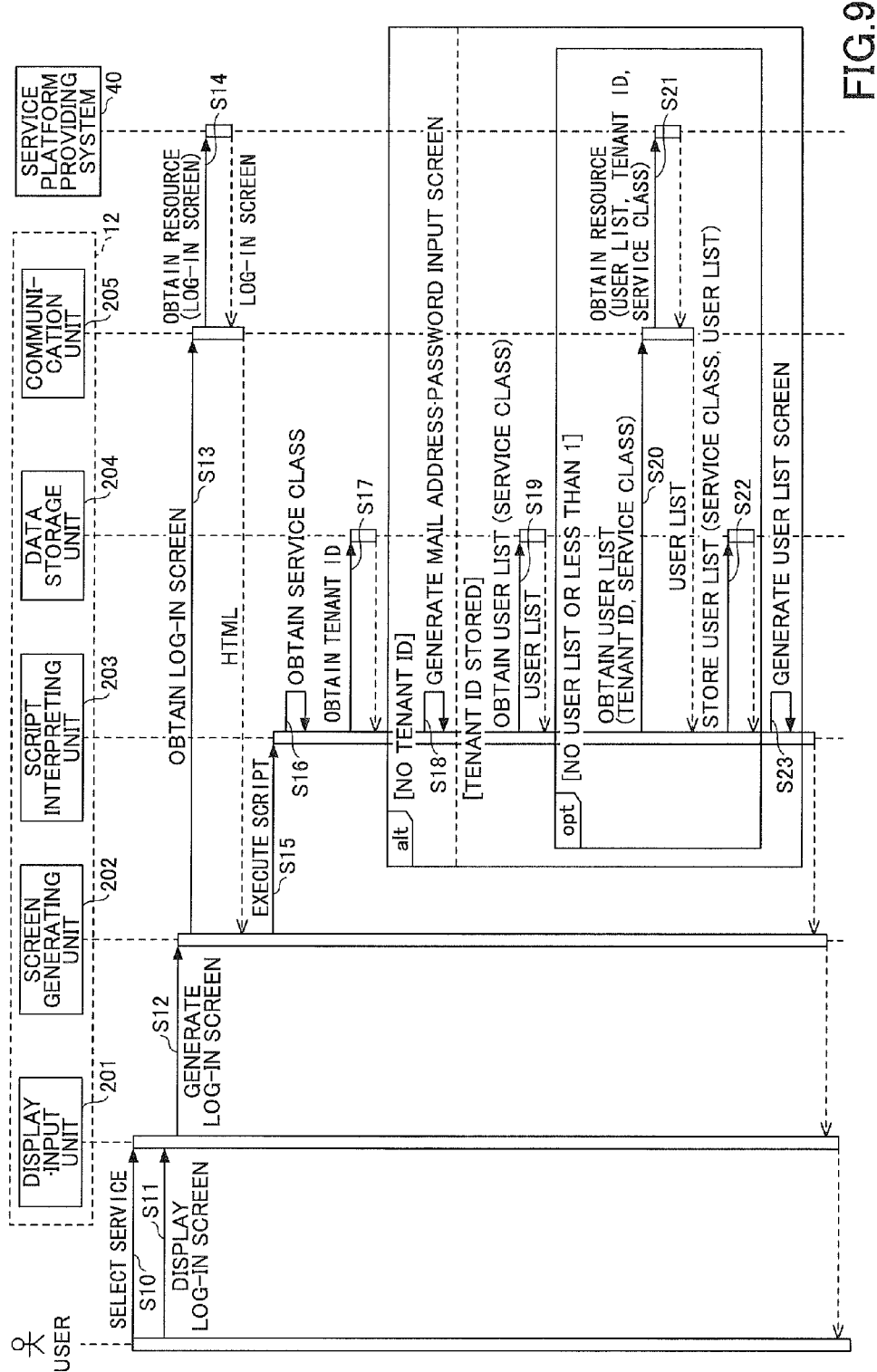
FIG. 9 is a view illustrating an example of a sequence for logging in of the embodiment.

In the data processing system 1, the image forming apparatus 12 logs in to the service platform providing system 40 when using a service provided by the service providing system 30, for example. FIG. 9 is a view illustrating an example of a sequence for logging in of the embodiment.

For the example of FIG. 9, when a user successfully logs in, the image forming apparatus 12 stores the tenant ID of the tenant to which the user belongs and controls display of a log-in screen based on whether the tenant ID is stored or not, when displaying the log-in screen, for example.

Usually, the image forming apparatus 12 is provided at a place like a workplace, for example, and the image forming apparatus 12 is commonly used by a plurality of users who belong to the place. In this case, such users may be set to belong to the same tenant. In other words, the users who belong to the same place and the tenant are provided with the same tenant ID.

Then, in this embodiment, if either of the users successfully logs in to the service platform providing system 40 from the image forming apparatus 12, the tenant ID of the user is stored in the data storage unit 204 of the image forming apparatus 12. Then, if either of the users tries to log in to the service platform providing system 40 thereafter, if the tenant ID is stored, a log-in screen in which a user list of users who belong to the tenant is displayed is displayed. Thus, if either of the users (a first user) is already succeeded in logging in, it is unnecessary for another user who belongs to the same tenant as the first user to input the mail address.

On the other hand, when the tenant ID is not stored, it means that no user is succeeded in logging in, and thus, a log-in screen for inputting user specifying data (a mail address and a password, for example) is displayed.

Specifically, the sequence illustrated in FIG. 9 is performed by the display•input unit 201, the screen generating unit 202, the script interpreting unit 203, the data storage unit 204 and the communication unit 205 of the image forming apparatus 12 and the service platform providing system 40.

As illustrated in FIG. 9, at the image forming apparatus 12, the display•input unit 201 accepts, from a user, a selection of a service from an application list screen of an application market (S10), and a request to display a log-in screen of the selected service (S11), for example. The screen generating unit 202, upon receiving a request to generate the log-in screen from the display•input unit 201 (S12), requests the communication unit 205 to obtain the log-in screen from the service platform providing system 40 (S13).

The service platform providing system 40, upon receiving the request to obtain the log-in screen as obtaining a resource via the communication unit 205 of the image forming apparatus 12 (S14), sends generated HTML data to the image forming apparatus 12. At the image forming apparatus 12, the screen generating unit 202 requests the script interpreting unit 203 to execute the script based on the HTML data obtained from the service platform providing system 40 (S15).

The script interpreting unit 203 obtains a service class of the service selected in the process of S10 (S16). In the process of S16, the script interpreting unit 203 obtains the service class from a character string ("translate" for the case of the "translation service") that identifies a service that is set as a query in URL (http://example.com/login?service_class=translate, for example) of the service selected in the process of S10.

Further, the script interpreting unit 203 requests the data storage unit 204 to obtain the tenant ID (S17). When the tenant ID is not stored in the data storage unit 204, the script interpreting unit 203 generates a mail address•password input screen as a first input screen (S18).

On the other hand, when the tenant ID is stored in the data storage unit 204, the script interpreting unit 203 requests the data storage unit 204 to obtain a user list by designating the service class obtained in the process of S16 (S19). In the process of S19, it is possible for the script interpreting unit 203 to obtain a user list of users who have authority of utilization for the designated service, by designating the service class when obtaining the user list.

When there is no user list or less than one in the data storage unit 204, the script interpreting unit 203 requests the communication unit 205 to obtain a user list from the from the service platform providing system 40 by designating the tenant ID and the service class (S20).

The service platform providing system 40 receives the request to obtain the user list in which the tenant ID and the service class are designated as obtaining a resource via the communication unit 205 of the image forming apparatus 12 (S21). In the process of S21, the service platform providing system 40 refers to the user data as illustrated in FIG. 7, and sends a user list of users who belong to the designated tenant ID and who have authority of utilization for a service corresponding to the service class, to the image forming apparatus 12.

At the image forming apparatus 12, the script interpreting unit 203 stores the user list obtained from the service platform providing system 40 in the data storage unit 204 (S22), and generates a screen (user list screen) for selecting a user from the user list as a second input screen (S23).

According to the above described sequence, for a first time log-in, as the user list is not stored in the data storage unit 204, the user list of the users who belong to the designated tenant ID and who have authority of utilization of the designated service is obtained from the from the service platform providing system 40. For a second or later time login, the log-in screen is generated using the user list stored in the data storage unit 204. With this configuration, the number of times for requesting to the service platform providing system 40 is reduced and performance for displaying a screen can be improved.

(Application List Screen)

Figure 10:
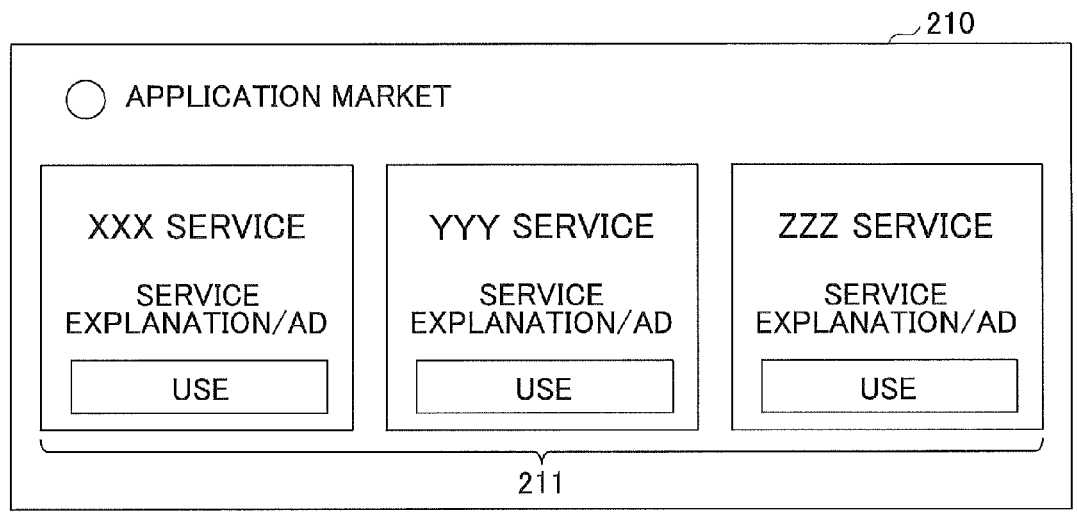
FIG. 10 is a view illustrating an example of an application list screen.

Next, the application list screen that is displayed on the operation panel 602 of the image forming apparatus 12 is explained. FIG. 10 illustrates an example of an application list screen 210. The application list screen 210 illustrated in FIG. 10 is an example of a screen for a user to select a service to use. The application list screen 210 includes buttons 211 for the user to select the service to use.

(Example of Log-in Screen for Inputting Mail Address)

Figure 11:
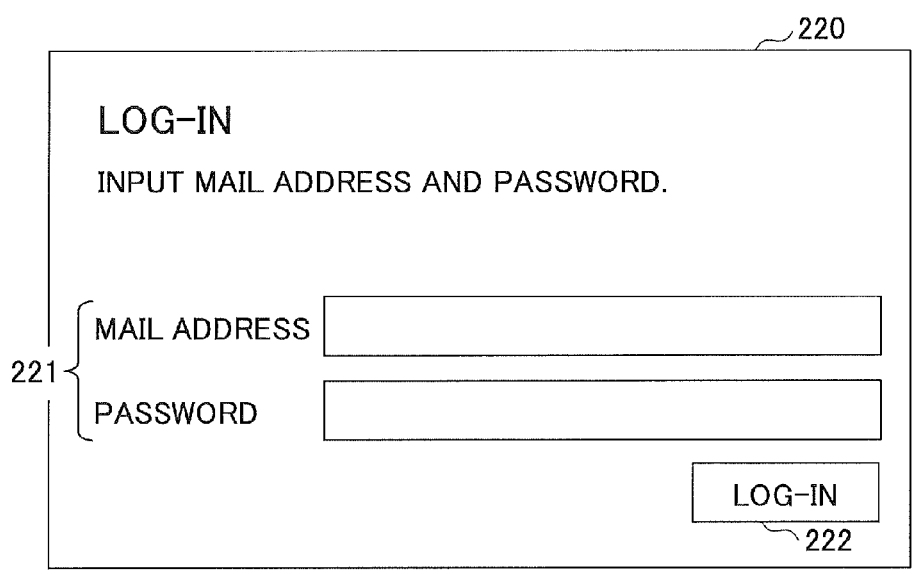
FIG. 11 is a view illustrating an example of a log-in screen for inputting a mail address.

When the button 211 of the service to use ("XXX service", for example) is selected from the application list screen 210 illustrated in FIG. 10, the image forming apparatus 12 displays either of the following two patterns of log-in screens based on whether the tenant ID is stored or not. A first pattern is a log-in screen (first input screen), for the case when the tenant ID is not stored, to input a mail address. FIG. 11 is a view illustrating an example of a log-in screen 220 to input a mail address.

The log-in screen 220 illustrated in FIG. 11 is displayed on the operation panel 602 of the image forming apparatus 12. The log-in screen 220 illustrated in FIG. 11 includes input sections 221 for a mail address and a password, and a "log-in" button 222. When the mail address and the password are input in the input sections 221 and the "log-in" button 222 is selected in the log-in screen 220, the image forming apparatus 12 requests the service platform providing system 40 to log in by designating the input mail address and the password as user specifying data.

(Example of Log-in Screen Using User List)

Figure 12A:
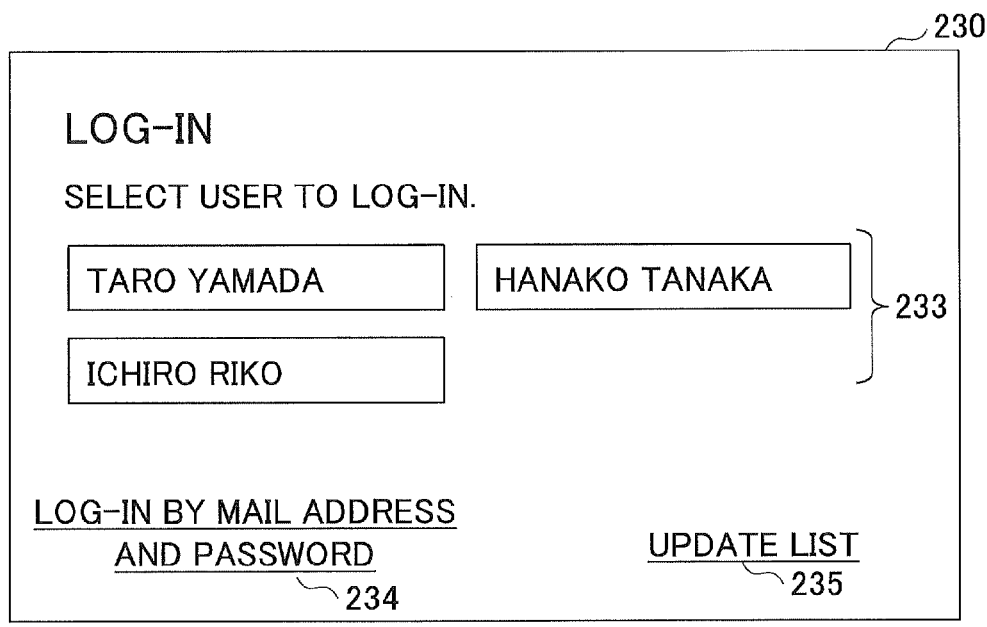
Figure 12B:
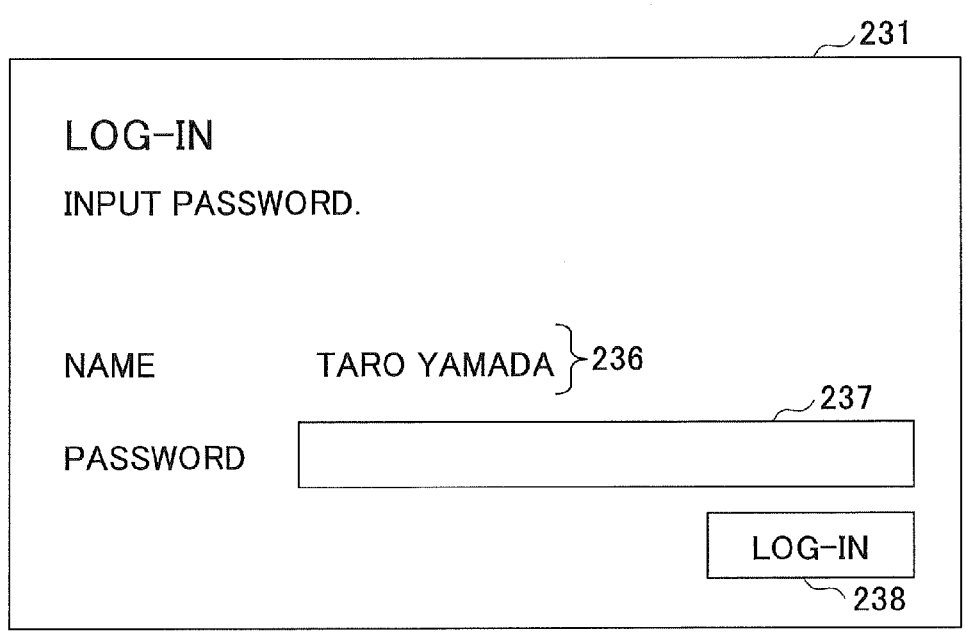

Next, as a second pattern, for the case when the tenant ID is stored, the image forming apparatus 12 displays a log-in screen (second input screen) using a user list. FIGS. 12A to FIG. 12C are views illustrating an example of a log-in screen using a user list. Log-in screens 230 to 232 illustrated in FIG. 12A to FIG. 12C, respectively, are displayed on the operation panel 602 of the image forming apparatus 12.

The log-in screen 230 illustrated in FIG. 12A includes a user list, buttons 233 for selecting a user from the user list, a button 234 indicating "log-in by the mail address and the password" and an "update list" button 235. In the user list of the log-in screen 230, user names of users who belong to the stored tenant ID and who have an authority of service utilization for the designated service class are displayed, for example.

Here, when obtaining the user list from the service platform providing system 40, the image forming apparatus 12 obtains association data that is associated with the user specifying data of the user who is successfully logged in among the user data illustrated in FIG. 7. The image forming apparatus 12 obtains, as the association data, the tenant ID of the succeeded user and the service class for which the succeeded user has an authority of service utilization, the user name, the mail address or the like of each of the users who belong to the tenant ID and have an authority of service utilization for the service class, for example.

When the button 233 for selecting the user from the user list is selected in the log-in screen 230, the image forming apparatus 12 transits to the log-in screen 231 illustrated in FIG. 12B. Further, when the button 234 indicating "log-in by the mail address and the password" is selected in the log-in screen 230, the image forming apparatus 12 transits to the log-in screen 232 illustrated in FIG. 12C. Further, when the "update list" button 235 is selected in the log-in screen 230, the image forming apparatus 12 requests the service platform providing system 40 to obtain a user list and updates the user list illustrated in FIG. 12B.

The log-in screen 231 illustrated in FIG. 12B includes a display section 236 for displaying the user name of the user selected from the user list, an input section 237 of a password and a "log-in" button 238.

When the password is input in the input section 237 and the "log-in" button 238 is selected in the log-in screen 231, the image forming apparatus 12 reads out the mail address of the user displayed at the display section 236 from the data storage unit 204, and requests the service platform providing system 40 to log in by designating the read out mail address and the input password.

As described above, it is possible to request the service platform providing system 40 to log in using the user specifying data (mail address of the user, password) similar to that of the first pattern just by selecting a user from the user list and inputting a password. Further, as it is unnecessary for the user to input a part (mail address of the user, for example) of the user specifying data necessary to log in, and the user needs to input the password only, efforts for inputting data for logging in for the user can be reduced.

The log-in screen 232 illustrated in FIG. 12C includes input sections 240 for a mail address and a password, a "log-in" button 241 and an "adding account" button 242. When the mail address and the password are input in the input sections 240 and the "log-in" button 241 is selected in the log-in screen 232, the image forming apparatus 12 request the service platform providing system 40 to log in by designating the mail address, the password and the stored tenant ID. Here, as the tenant ID is designated, even if the mail address and the password match, a user with a different tenant ID fails to log in.

Here, when the mail address and the password are input and the "adding account" button 243 is selected in the log-in screen 232, the image forming apparatus 12 requests the service platform providing system 40 to add an account by designating the mail address, the password, the service class and the tenant ID. The service platform providing system 40, upon receiving the request to add the account from the image forming apparatus 12, registers the account based on the designated user specifying data or the like. With this configuration, when the "update list" button 235 illustrated in FIG. 12A is selected, a user whose account is newly registered is also added in the user list illustrated in FIG. 12B.

(User List Stored in Data Storage Unit 204)

FIG. 13 is a view illustrating an example of data of a user list stored in the data storage unit 204. The data of the user list illustrated in FIG. 13 includes items such as "user name", "mail address" and the like.

The data of the user list illustrated in FIG. 13 is generated by obtaining the user name and the mail address of each of the users who belong to the tenant ID and have an authority of service utilization (for the service class) of the succeeded user who is successfully logged in, among the user data illustrated in FIG. 7, from the service platform providing system 40. Here, the data of the user list illustrated in FIG. 13 may be generated for each of the service classes, for example.

Among data of the user list illustrated in FIG. 13, the "user name" is displayed on the log-in screen 230 illustrated in FIG. 12A. Further, as described above, when the password is input in the input section 237 and the "log-in" button 238 is selected in the log-in screen 231 as illustrated in FIG. 12B, the "mail address" of the user whose name is displayed at the display section 236 is read out from the data storage unit 204.

(Sequence for Logging in by Mail Address)

Figure 14:
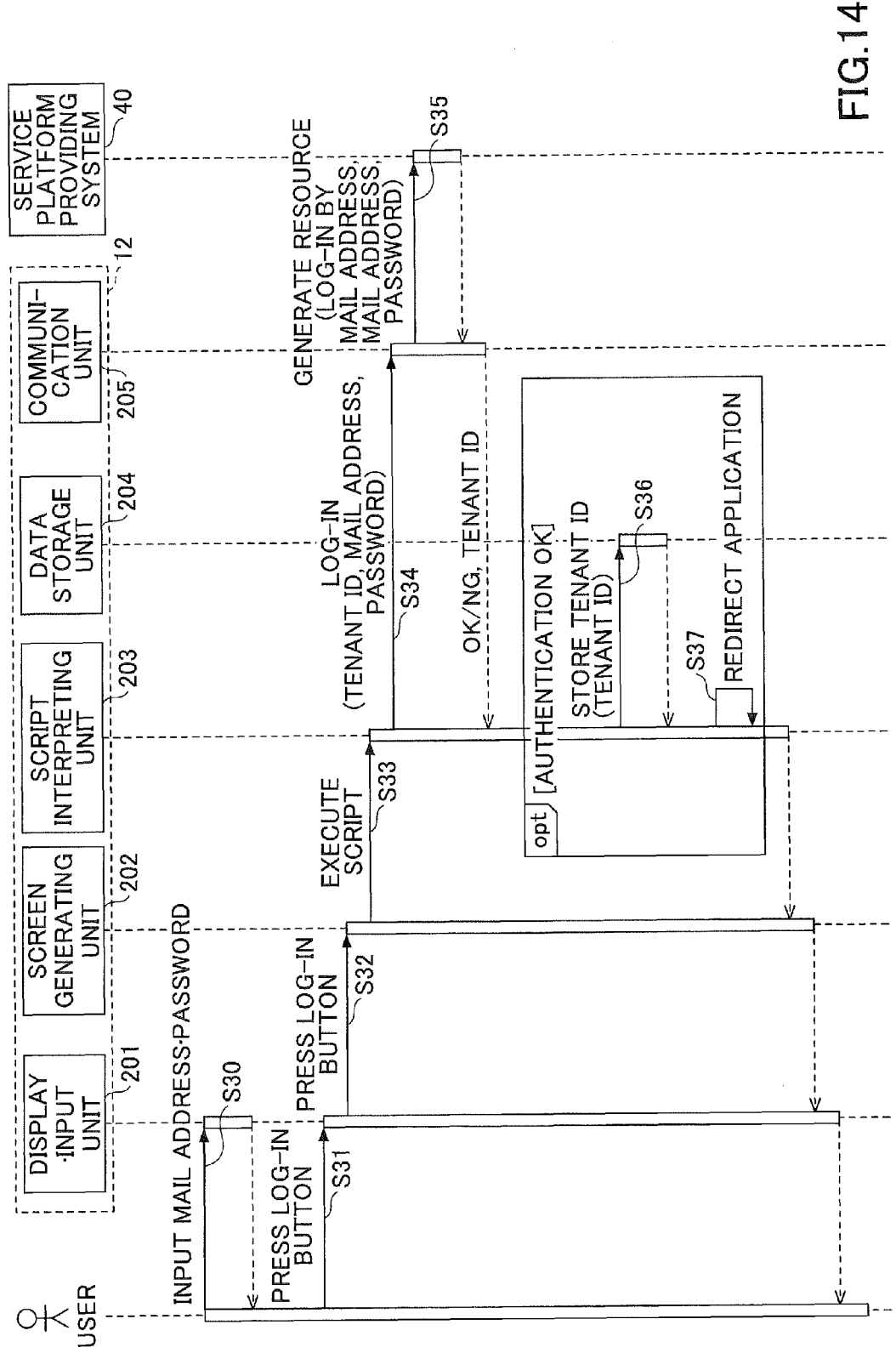
FIG. 14 is a view illustrating an example of a sequence for logging in by an mail address.

Next, a sequence for logging in by the mail address is explained. FIG. 14 is a view illustrating an example of a sequence for logging in by a mail address. For the example of FIG. 14, the user logs in by the mail address and the password (user specifying data) input in the log-in screen or the like generated in the process of S18 of FIG. 9.

The sequence illustrated in FIG. 14 is performed by the display•input unit 201, the screen generating unit 202, the script interpreting unit 203, the data storage unit 204 and the communication unit 205 of the image forming apparatus 12 and the service platform providing system 40.

As illustrated in FIG. 14, at the image forming apparatus 12, the display•input unit 201 accepts, from a user, an input of the mail address and the password in the log-in screen illustrated in FIG. 11 (S30), and pressing of the log-in button (S31), for example. The screen generating unit 202, upon receiving pressing of the log-in button from the display•input unit 201 (S32), requests the script interpreting unit 203 to execute the script (S33).

The script interpreting unit 203 requests the communication unit 205 to log in by designating the mail address and the password (S34). Here, in the process of S34, when the tenant ID is stored in the data storage unit 204, such as a case that the mail address and the password are input from the log-in screen illustrated in FIG. 12C or the like, for example, the tenant ID is also sent as a parameter.

The service platform providing system 40 receives the request to log in by the mail address in which the mail address and the password are designated as generating a resource via the communication unit 205 of the image forming apparatus 12 (S35).

Here, the service platform providing system 40 refers to the user data illustrated in FIG. 7, authenticates the user using the mail address and the password received in the process of S35, and notifies the authentication result to the image forming apparatus 12. When the user is successfully authenticated, the service platform providing system 40 sends the tenant ID to which the user specified by the mail address and the password belongs with a notification of authentication OK. Further, when the authentication of the user is failed, the service platform providing system 40 sends a notification of authentication NG (error).

Here, when the service platform providing system 40 receives the tenant ID with the mail address and the password, and the tenant ID of the user specified by the mail address and the password and the received tenant ID are different, the service platform providing system 40 sends a notification of authentication error.

At the image forming apparatus 12, when the notification of authentication OK is received based on the authentication result notified from the service platform providing system 40, the tenant ID is stored in the data storage unit 204 (S36). Further, at this time, the image forming apparatus 12 redirects the application (service) that is selected from the application list screen by the user in the process of S10 in FIG. 9 (S37).

When the tenant ID is stored in the process of S36, even when the newly accepted mail address and password are right, if the user does not belong to the tenant of the stored tenant ID, an authentication error is sent from the service platform providing system 40. As such, it is possible to control that, after once the tenant ID is stored, a user who belong to another tenant cannot log in from the image forming apparatus 12 to use the application.

(Example of Sequence for Logging In from User List)

Figure 15:
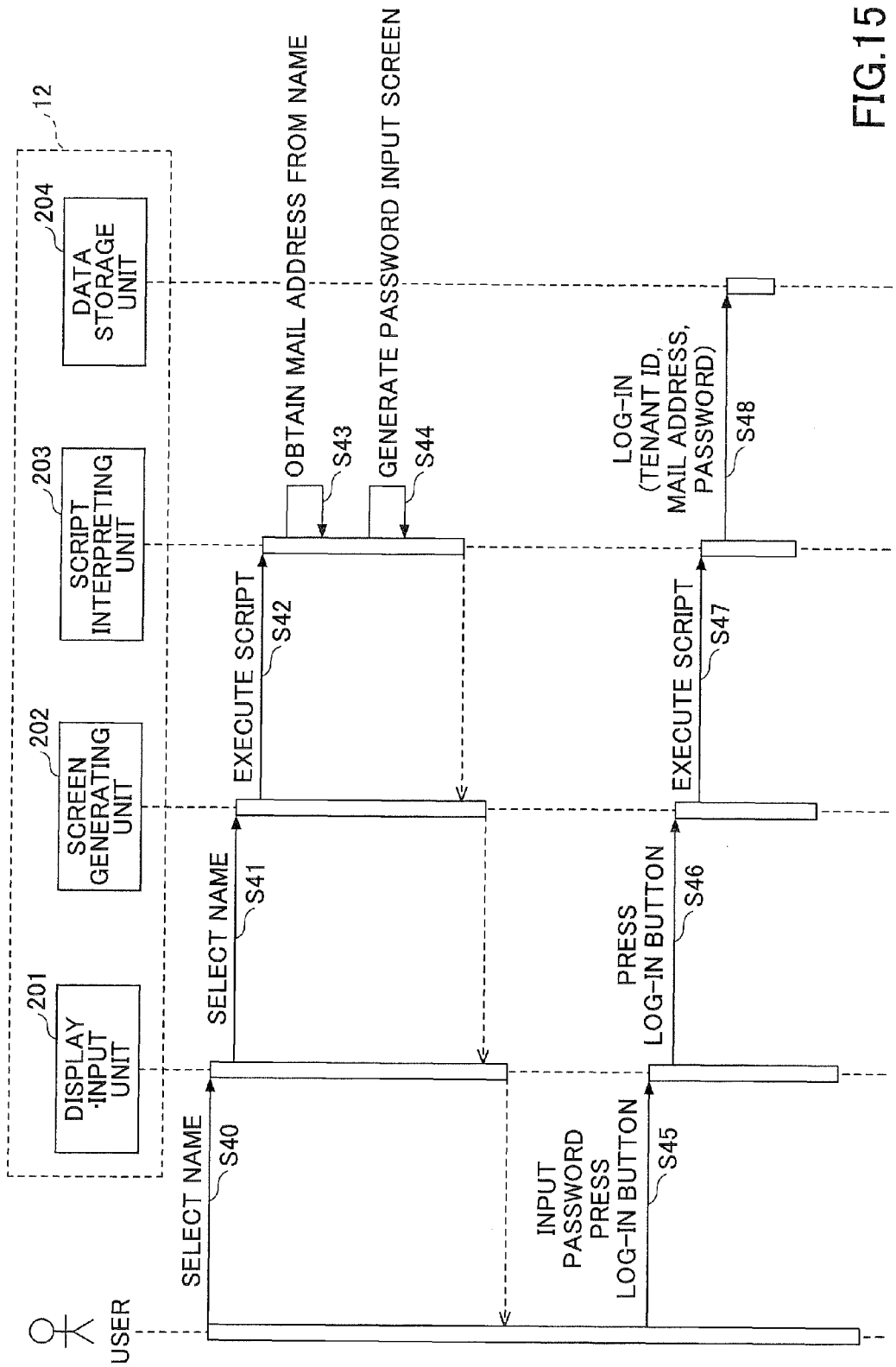
FIG. 15 is a view illustrating an example of a sequence for logging in using a user list.

Next, a sequence for logging in from the log-in screen using the user list is explained. FIG. 15 is a view illustrating an example of a sequence for logging in from the user list. The sequence illustrated in FIG. 15 is performed by the display•input unit 201, screen generating unit 202, the script interpreting unit 203 and the data storage unit 204 of the image forming apparatus 12.

As illustrated in FIG. 15, at the image forming apparatus 12, the display•input unit 201 accepts, from a user, a selection of a user name to be logged in from the user list displayed on the log-in screen illustrated in FIG. 12A, for example (S40). The screen generating unit 202, upon receiving the selected user name from the display•input unit 201 (S41), requests the script interpreting unit 203 to execute the script (S42).

The script interpreting unit 203, upon obtaining the mail address corresponding to the user name selected from the user list from data storage unit 204 and internally storing it (S43), generates the log-in screen (password input screen) illustrated in FIG. 12B for inputting a password and displays it (S44).

The display•input unit 201 accepts, from the user, an input of a password and pressing of the log-in button in the log-in screen illustrated in the process of S44 (S45). The screen generating unit 202, upon receiving pressing of the log-in button from the display•input unit 201 (S46), requests the script interpreting unit 203 to execute the script (S47).

The script interpreting unit 203, upon obtaining the tenant ID stored in the data storage unit 204 (S48), requests the service platform providing system 40 to log in via the communication unit 205 by designating the mail address stored in the process of S43, the password input by the user and the tenant ID. As subsequent processes are the same as the processes after S35 illustrated in FIG. 14, explanations are not repeated.

As the mail address and the password are used for the service platform providing system 40 in the log-in process illustrated in FIG. 15, it is similar to that illustrated in FIG. 14. However, in this case, as the user is unnecessary to input the mail address, time and efforts can be simplified.

(Setting Screen for Setting whether to permit Usage of User List)

By selecting the button 234 indicating "log-in by the mail address and the password" illustrated in the log-in screen 230 of FIG. 12A, the user may log in by the mail address and the password using the log-in screen 232 illustrated in FIG. 12C instead of logging in from the user list. Here, for the log-in process using the user list, information regarding users who belong to the tenant, a status of the authority of utilization for the service or the like is displayed so that the user who tries to log in can see the information or the like. Thus, whether the log-in process using the user list is permitted or not may be controlled.

Figure 16:
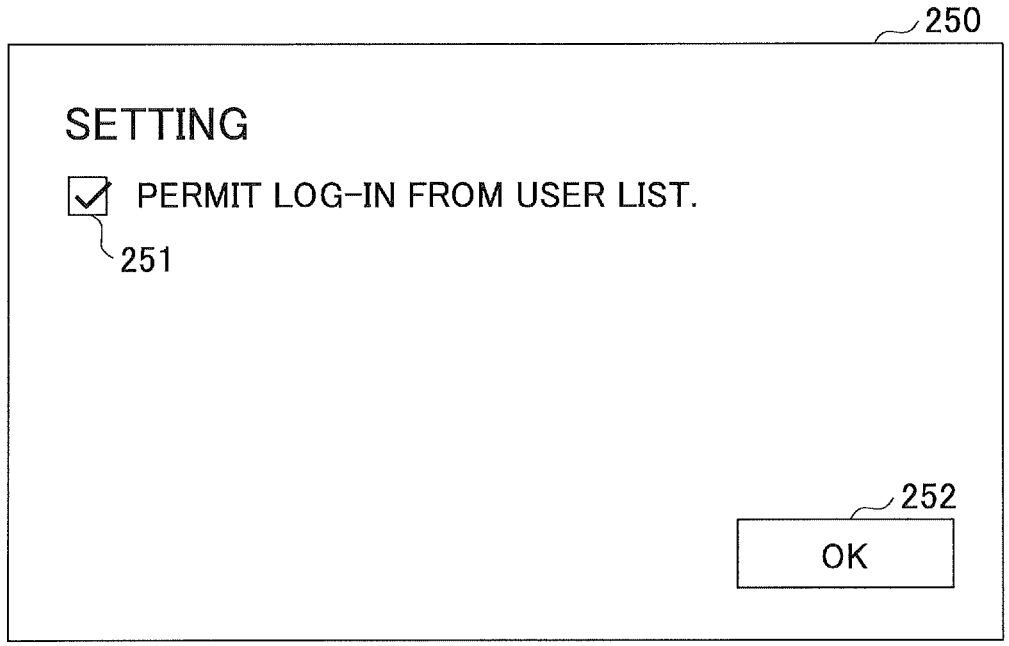
FIG. 16 is a view illustrating an example of a setting screen for setting whether to permit usage of a user list.

FIG. 16 is a view illustrating an example of a setting screen 250 for setting whether to permit usage of a user list. The setting screen 250 illustrated in FIG. 16 includes a check box 251 for "permit log-in from user list" and an "OK" button 252, for example. For example, an administrator or the like of the image forming apparatus 12 can set whether to permit usage of a user list by changing a checking status of the check box 251 and selecting the "OK" button 252.

(Sequence for Setting whether to permit Using Usage of User List)

Figure 17:
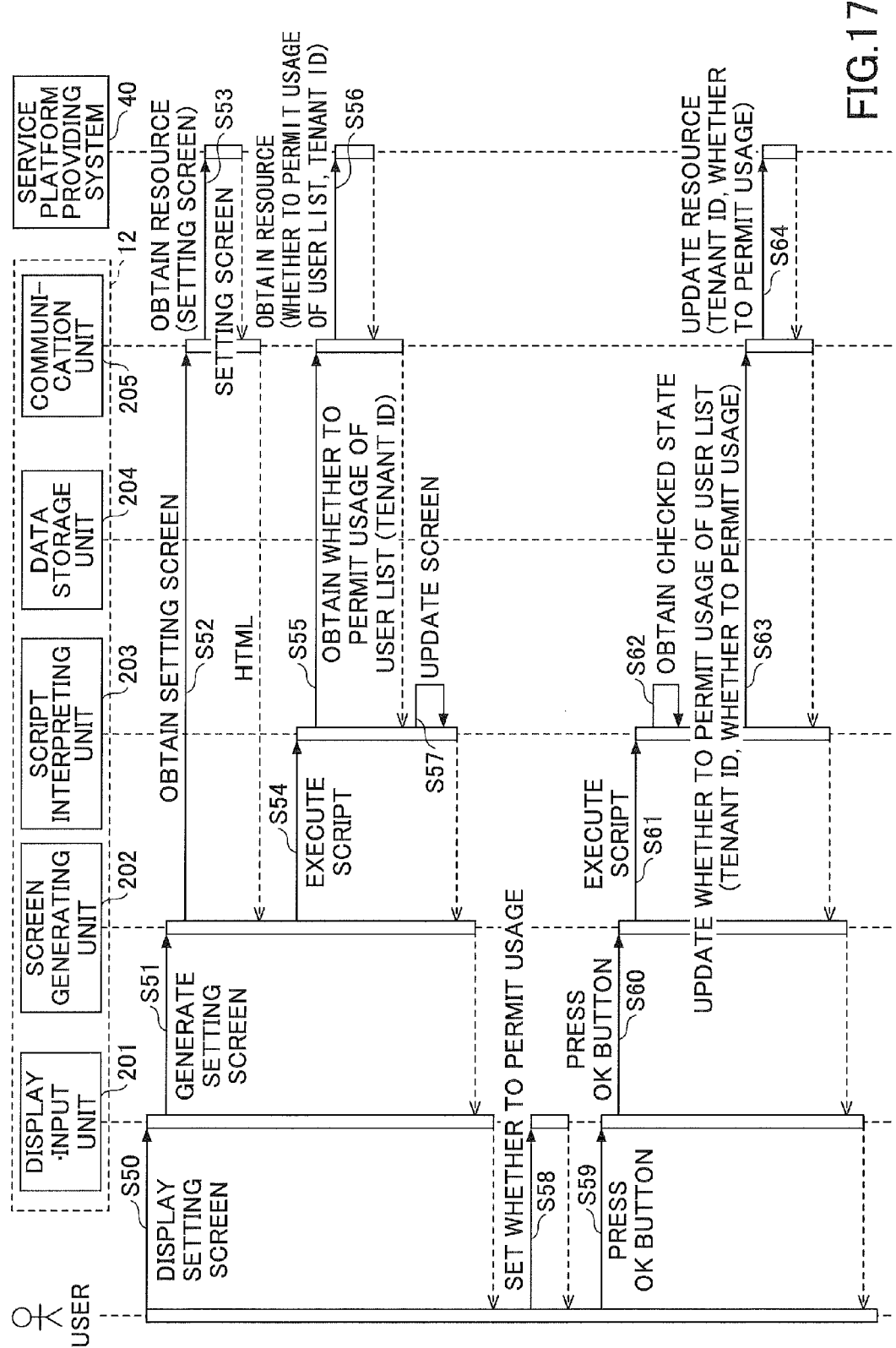
FIG. 17 is a view illustrating an example of a sequence for setting whether to permit usage of a user list.

Next, a sequence for executing setting whether to permit usage of a user list to the service platform providing system 40 is explained. FIG. 17 is a view illustrating an example of a sequence for setting whether to permit usage of a user list.

The sequence illustrated in FIG. 17 is performed by the display•input unit 201, the screen generating unit 202, the script interpreting unit 203, the data storage unit 204 and the communication unit 205 of the image forming apparatus 12 and the service platform providing system 40. In this case, the information indicating whether to permit usage of a user list that is previously set by the administrator or the like of the image forming apparatus 12 is stored in the service platform providing system 40 in association with the tenant ID, for example.

As illustrated in FIG. 17, at the image forming apparatus 12, the display input unit 201 accepts, from a user, a request to display the setting screen 250 illustrated in FIG. 16, for example (S50). The screen generating unit 202, upon receiving a request to generate the setting screen 250 from the display•input unit 201 (S51), requests the communication unit 205 to obtain the setting screen 250 from the service platform providing system 40 (S52).

The service platform providing system 40, upon receiving the request to obtain the setting screen 250 as obtaining a resource via the communication unit 205 of the image forming apparatus 12 (S53), sends generated HTML data to the image forming apparatus 12. At the image forming apparatus 12, the screen generating unit 202 requests the script interpreting unit 203 to execute the script based on the HTML data obtained from the service platform providing system 40 (S54).

The script interpreting unit 203 obtains the tenant ID from the data storage unit 204, and requests the communication unit 205 to obtain information indicating whether to permit usage of a user list from the service platform providing system 40 by designated the tenant ID (S55). The service platform providing system 40, upon receiving the request to obtain the information indicating whether to permit usage of a user list as obtaining a resource via the communication unit 205 of the image forming apparatus 12 (S56), notifies the image forming apparatus 12 the information indicating whether to permit usage of a user list.

At the image forming apparatus 12, the script interpreting unit 203 updates the setting screen 250 based on the information indicating whether to permit usage of a user list notified from the service platform providing system 40 (S57). The script interpreting unit 203, based on the information indicating whether to permit usage of a user list notified from the service platform providing system 40, adds a check in the check box 251 when usage of the user list is permitted, and deletes the check of the check box 251 of the setting screen 250 when usage of the user list is not permitted, in the setting screen 250.

The display•input unit 201 accepts, from the user, setting of the check in the check box 251 from the setting screen 250 (S58), and pressing of the OK button 252 (S59). The screen generating unit 202, upon receiving pressing of the OK button 252 from the display•input unit 201 (S60), requests the script interpreting unit 203 to execute the script (S61).

The script interpreting unit 203, upon obtaining a status of the check box 251 of the setting screen 250 (S62), requests the communication unit 205 to update the information indicating whether to permit usage of a user list by designating the tenant ID and the information indicating whether to permit set by the user in the service platform providing system 40 (S63). The service platform providing system 40, upon receiving a request to update a resource via the communication unit 205 of the image forming apparatus 12 (S64), updates the information indicating whether to permit usage of a user list for the tenant ID.

(Sequence for obtaining User List based on Information indicating whether to permit usage of User List)

Next, a sequence for obtaining a user list based on the information indicating whether to permit usage of a user list set in the service platform providing system 40 in the sequence illustrated in FIG. 17 is explained.

Figure 18:
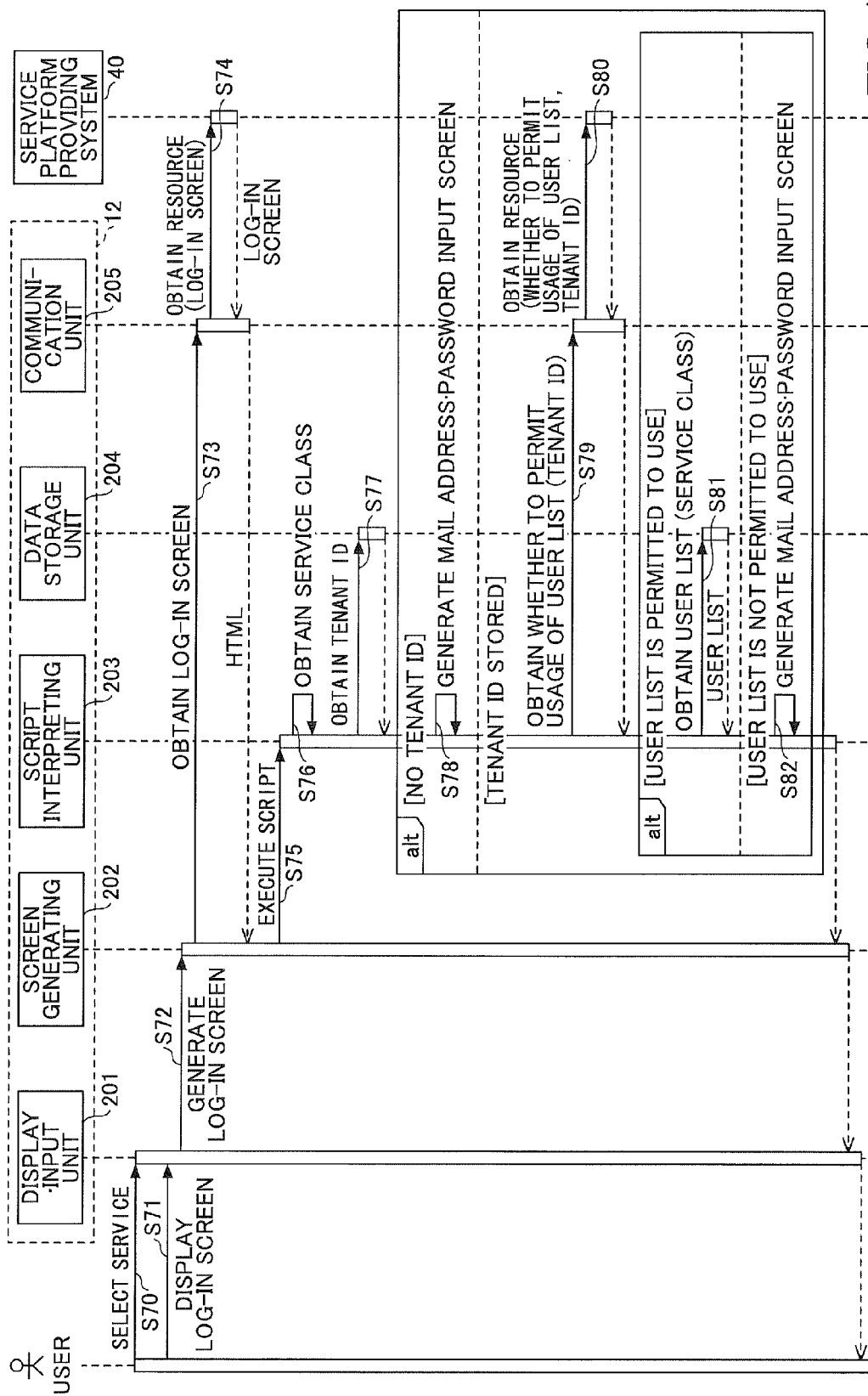
FIG. 18 is a view illustrating an example of a sequence for obtaining a user list based on information indicating whether to permit usage of a user list.

FIG. 18 is a view illustrating an example of a sequence for obtaining a user list based on the information indicating whether to permit usage of a user list. The sequence illustrated in FIG. 18 is performed by the display•input unit 201, the screen generating unit 202, the script interpreting unit 203, the data storage unit 204 and the communication unit 205 of the image forming apparatus 12 and the service platform providing system 40. Here, as processes of S70 to S77 illustrated in FIG. 18 are the same as those of S10 to S17 illustrated in FIG. 9, explanations are not repeated.

For the example of FIG. 18, in response to a request to display a log-in screen by the user, when the tenant ID is not stored in the data storage unit 204 in the process of S77, the script interpreting unit 203 of the image forming apparatus 12 generates the mail address•password input screen (S78).

On the other hand, when the tenant ID is stored in the data storage unit 204, the script interpreting unit 203 requests the communication unit 205 to obtain information indicating whether to permit usage of a user list from the service platform providing system 40 by designating the tenant ID (S79). The service platform providing system 40, upon receiving the request to obtain the information indicating whether to permit usage of a user list as obtaining a resource via the communication unit 205 of the image forming apparatus 12 (S80), notifies the information indicating whether to permit usage of a user list to the image forming apparatus 12.

When the usage of the user list is permitted based on the information indicating whether to permit usage of a user list notified from the service platform providing system 40, the script interpreting unit 203 refers to the data storage unit 204 to obtain the user list by designating the service class obtained in the process of S76 (S81). When the usage of the user list is not permitted, the script interpreting unit 203 generates the mail address•password input screen illustrated in FIG. 11 (S82). Here, in the process of S82, the mail address•password input screen is controlled not to display a switching link to the log-in screen in which the user list is displayed illustrated in FIG. 12B, for example.

Figure 19:
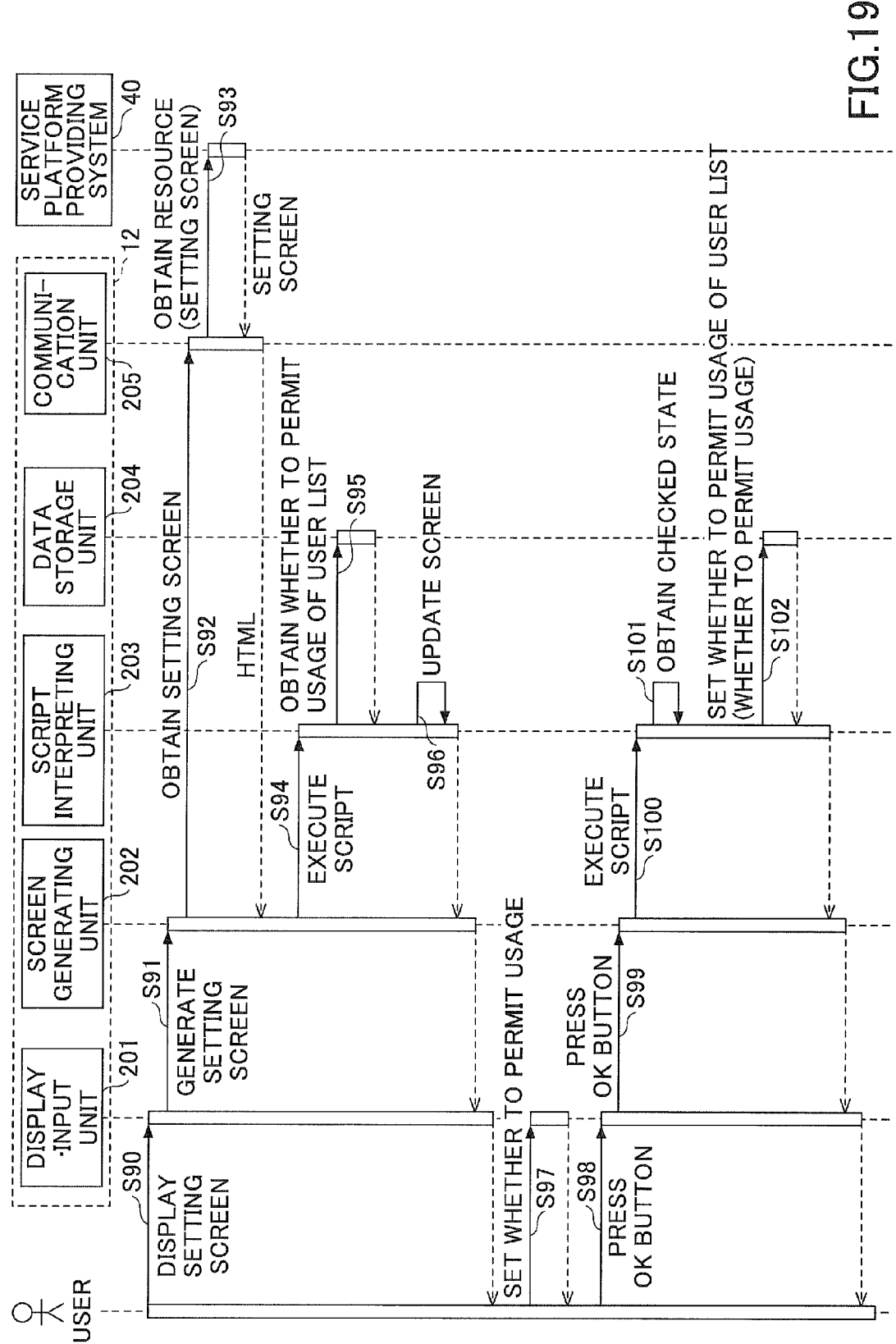
FIG. 19 is a view illustrating an example of a sequence for setting whether to permit usage of a user list at the image forming apparatus.

As whether to permit usage of a user list is set (stored) in the service platform providing system 40 in the sequences illustrated in FIG. 18 and FIG. 19, it is possible to set whether to permit usage of a user list for each tenant ID, for example.

(Sequence of Setting whether to permit Usage of User List at Image Forming Apparatus 12)

Next, a sequence for setting (and storing) whether to permit usage of a user list as described above in the image forming apparatus 12 is explained. FIG. 19 is a view illustrating an example of a sequence for setting whether to permit usage of a user list at the image forming apparatus 12.

The sequence illustrated in FIG. 19 is actualized by the display•input unit 201, the screen generating unit 202, the script interpreting unit 203, the data storage unit 204 and the communication unit 205 of the image forming apparatus 12, and the service platform providing system 40. In this case, the information indicating whether to permit usage of a user list that is previously set by the administrator or the like of the image forming apparatus 12 is stored in the data storage unit 204, for example. Here, as processes of S90 to S94 illustrated in FIG. 19 are the same as those of S50 to S54 illustrated in FIG. 17, explanations are not repeated.

For the example of FIG. 19, in response to a request to display the setting screen 250 for setting whether to permit usage of a user list, the script interpreting unit 203 of the image forming apparatus 12 refers to the data storage unit 204 to obtain the information indicating whether to permit usage of a user list (S95). The script interpreting unit 203 updates the setting screen 250 based on the information indicating whether to permit usage of a user list obtained from the data storage unit 204 (S96). Here, in the process of S96, as the information indicating whether to permit usage of a user list is not stored in the data storage unit 204 for a first time, the script interpreting unit 203 may add ("permitted to use") or not add ("not permitted to use") a check in the check box of the setting screen 250 as a default.

At the image forming apparatus 12, the display•input unit 201 accepts, from a user, a setting of the check in the check box 251 from the setting screen 250 (S97), and pressing of the OK button 252 (S98). The screen generating unit 202, upon receiving pressing of the OK button 252 from the display•input unit 201 (S99), requests the script interpreting unit 203 to execute the script (S100).

The script interpreting unit 203, upon obtaining the above described status of the check box 251 of the setting screen 250 (S101), updates the information indicating whether to permit usage of a user list set by the user (S102).

(Sequence for obtaining User List based on Information indicating whether to permit usage of a User List Set at Image Forming Apparatus 12)

Figure 20:
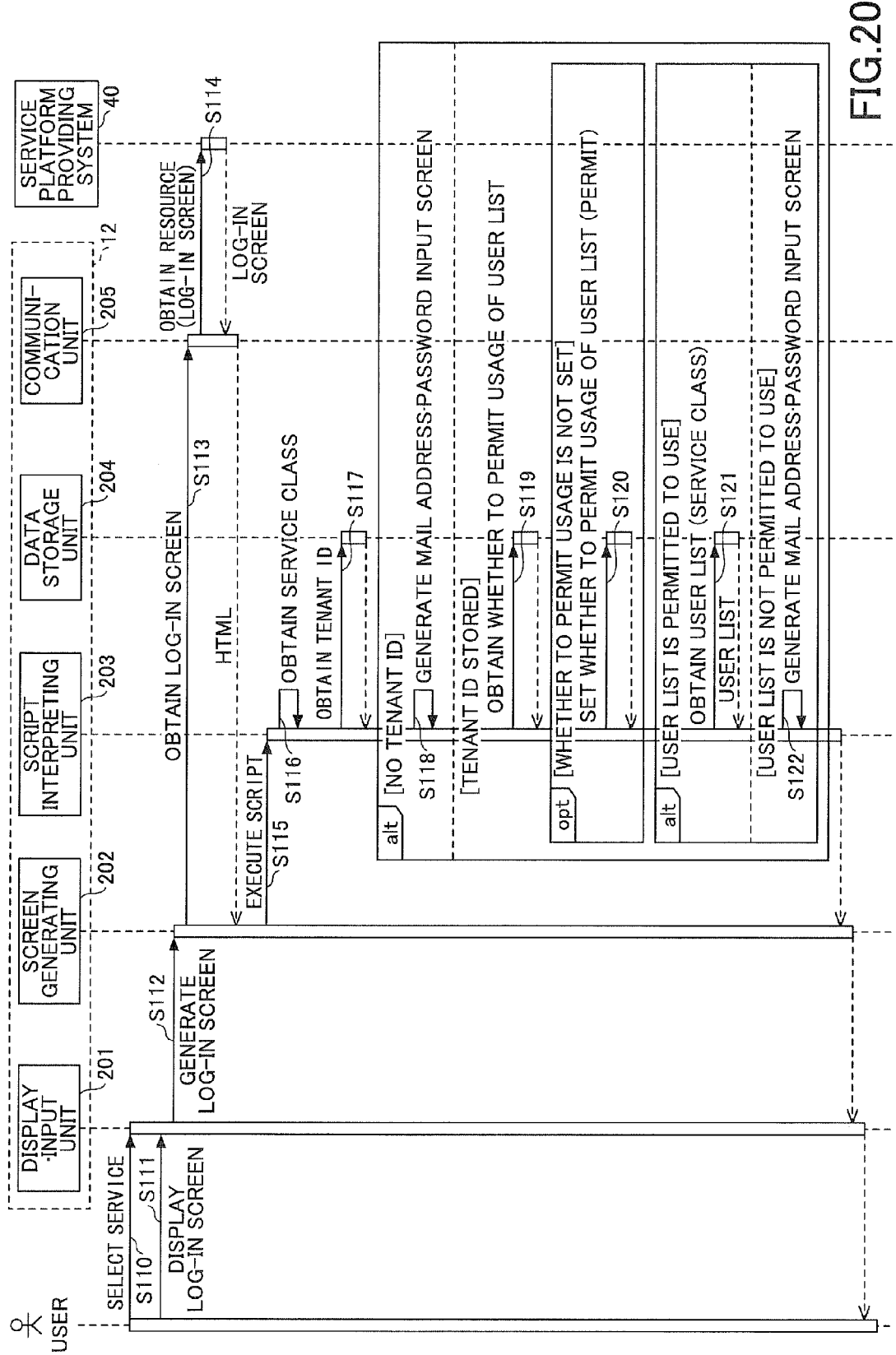
FIG. 20 is a view illustrating an example of a sequence for obtaining a user list based on information indicating whether to permit usage of a user list at the image forming apparatus.

Next, a sequence for obtaining a user list based on the information indicating whether to permit usage of a user list set in the image forming apparatus 12 in the sequence illustrated in FIG. 19 is explained. FIG. 20 is a view illustrating an example of a sequence for obtaining a user list based on the information indicating whether to permit usage of a user list at the image forming apparatus 12.

The sequence illustrated in FIG. 20 is performed by the display•input unit 201, the screen generating unit 202, script interpreting unit 203, data storage unit 204, communication unit 205 of the image forming apparatus 12, and the service platform providing system 40. Here, as process of S110 to S117 illustrated in FIG. 20 are the same as those of S10 to S17 illustrated in FIG. 9, explanations are not repeated.

For the example of FIG. 20, in response to a request to display a log-in screen by the user, when the tenant ID is not stored in the data storage unit 204 in the process of S117, the script interpreting unit 203 of the image forming apparatus 12 generates the mail address•password input screen (S118).

On the other hand, when the tenant ID is stored in the data storage unit 204, the script interpreting unit 203 refers to the data storage unit 204 to obtain information indicating whether to permit usage of a user list (S119).

When the usage of the user list is permitted based on the information indicating whether to permit usage of a user list obtained from the data storage unit 204, the script interpreting unit 203 refers to the data storage unit 204 to obtain the user list by designating the service class obtained in the process of S116 (S121). When the usage of the user list is not permitted, the script interpreting unit 203 generates the mail address•password input screen illustrated in FIG. 11 (S122). Here, in the process of S122, the mail address•password input screen is controlled not to display a switching link to the log-in screen in which the user list is displayed illustrated in FIG. 12B, for example.

Figure 21:
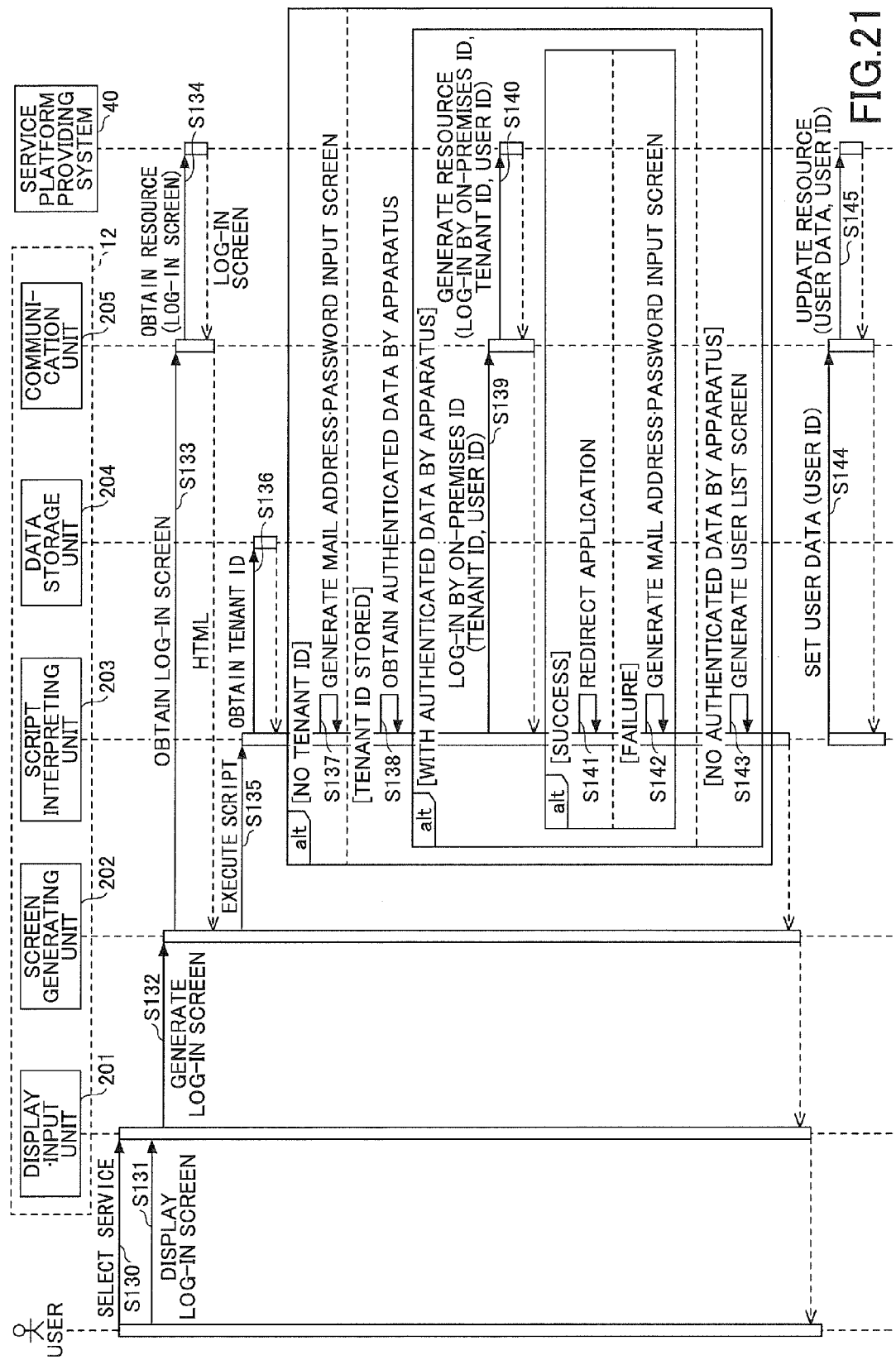
FIG. 21 is a view illustrating an example of a sequence for cooperation with authentication by an apparatus.

As whether to permit usage of a user list is set in the image forming apparatus 12 in the sequences illustrated in FIG. 20 and FIG. 21, it is possible to set the setting of whether to permit usage of a user list for each image forming apparatus 12.

(Example of Sequence for Cooperation with Authentication by Apparatus)

Next, a sequence for cooperation with authentication by the image forming apparatus 12 is explained. In this case, when cooperating with the authentication by the apparatus, it is unnecessary for the user who is already successfully logged in to the image forming apparatus to perform a log-in process again for using the above described application. FIG. 21 is a view illustrating an example of a sequence for cooperation with the authentication by the apparatus.

The sequence illustrated in FIG. 21 is performed by the display•input unit 201, the screen generating unit 202, the script interpreting unit 203, the data storage unit 204 and the communication unit 205 of the image forming apparatus 12 and the service platform providing system 40.

For the sequence illustrated in FIG. 21, the user data illustrated in FIG. 7 further includes a data item "on-premises ID" or the like, for example, for registering second user specifying data (user ID, for example) that is used for the authentication of the user to log in to the image forming apparatus 12. Upon receiving a request to log in by the on-premises ID from the image forming apparatus 12, the service platform providing system 40 may refer to the second user specifying data of the user data illustrated in FIG. 7 and authenticate the user.

Here, as processes of S130 to S135 illustrated in FIG. 21 are the same as those of S10 to S15 illustrated in FIG. 9, explanations are not repeated. For the example of FIG. 21, at the image forming apparatus 12, in response to a request to display a log-in screen by the user, the script interpreting unit 203 refers to the data storage unit 204 to obtain the tenant ID (S136). When the tenant ID is not stored in the data storage unit 204, the script interpreting unit 203 generates the mail address•password input screen (S137). On the other hand, when the tenant ID is stored in the data storage unit 204, the script interpreting unit 203 obtains the second user specifying data (hereinafter, referred to as "authenticated data by the apparatus" as well) that was used for the user to log in to the image forming apparatus 12 (S138). This means that, when the user is logged in to the image forming apparatus 12, the second user specifying data of the user is stored in the data storage unit 204 or the like in the image forming apparatus 12. Thus, this second user specifying data of the user is used as the "authenticated data by the apparatus" in this example.

The script interpreting unit 203, upon obtaining the authenticated data by the apparatus in the process of S138 (authenticated data by the apparatus exists), request the communication unit 205 to log in by the on-premises ID by designating the tenant ID obtained in the process of S136, and the authentication by the apparatus (user ID) obtained in the process of S138 (S139).

The service platform providing system 40 receives the request to log in by the on-premises ID in which the tenant ID and the user ID used for the authentication by the apparatus are designated as generating a resource via the communication unit 205 of the image forming apparatus 12 (S140). The service platform providing system 40 authenticates the user using the tenant ID and the user ID used for the authentication by the apparatus received in the process of S140, and notifies an authentication result to the image forming apparatus 12.

At the image forming apparatus 12, when the authentication result notified from the service platform providing system 40 is authentication OK (success), the script interpreting unit 203 redirects the application (service) selected from the application list screen (S141). For the case of authentication NG (failure), the script interpreting unit 203 generates the mail address•password input screen (S142). Further, the script interpreting unit 203, when the authenticated data by the apparatus cannot be obtained (no authenticated data by the apparatus), generates the user list screen illustrated in FIG. 12A (S143).

Here, the case of the failure in authentication of the user using the on-premises ID includes a case that the user ID used for the authentication by the apparatus is not set in the data item of the on-premises ID of the user data illustrated in FIG. 7. Thus, after the process of S142, when the user is successfully authenticated by the mail address and the password, the script interpreting unit 203 requests the communication unit 205 to set identification data by designating the user ID used for the authentication by the apparatus (S144).

Upon receiving a request to update the resource via the communication unit 205 of the image forming apparatus 12 (S145), the service platform providing system 40 may set the user ID used for the authentication by the apparatus for the data item of the on-premises ID in the user data illustrated in FIG. 7.

As described above, when the user is already logged in the image forming apparatus 12, the user can use the application (service) without performing a log-in process to the service platform providing system 40 again.

(Authentication of Apparatus)

In each of the above described sequences, the user list is obtained using the tenant ID. This means that it is possible to obtain data regarding users who belong to the tenant based on the tenant ID. Thus, the service platform providing system 40 may authenticate an apparatus in order to limit the usage of the user list to the previously set image forming apparatus 12 in response to a request to obtain the user list.

For authenticating an apparatus, for example, a client authentication of SSL (Secure Sockets Layer) may be used, or the apparatus may be authenticated by embedding a previously set password in a browser or the like.

Further, the script interpreting unit 203 or the like of the image forming apparatus 12 may generate an apparatus authentication password, the authentication•certification unit 131 or the like of the service platform providing system 40 may generate an apparatus authentication ticket by the apparatus authentication password obtained from the image forming apparatus 12 and send it to the image forming apparatus 12. The service platform providing system 40 may, when receiving a request to obtain a user list from the image forming apparatus 12, limit the access for obtaining the user list based on whether the apparatus authentication ticket exists or not.

(When Tenant ID is not designated)

Next, a sequence for logging in without using the tenant ID is explained. For example, it is possible to control such that a log-in is performed without designating tenant ID based on a setting by setting whether to log in by designating tenant ID using the setting screen 250 illustrated in FIG. 16.

Figure 22:
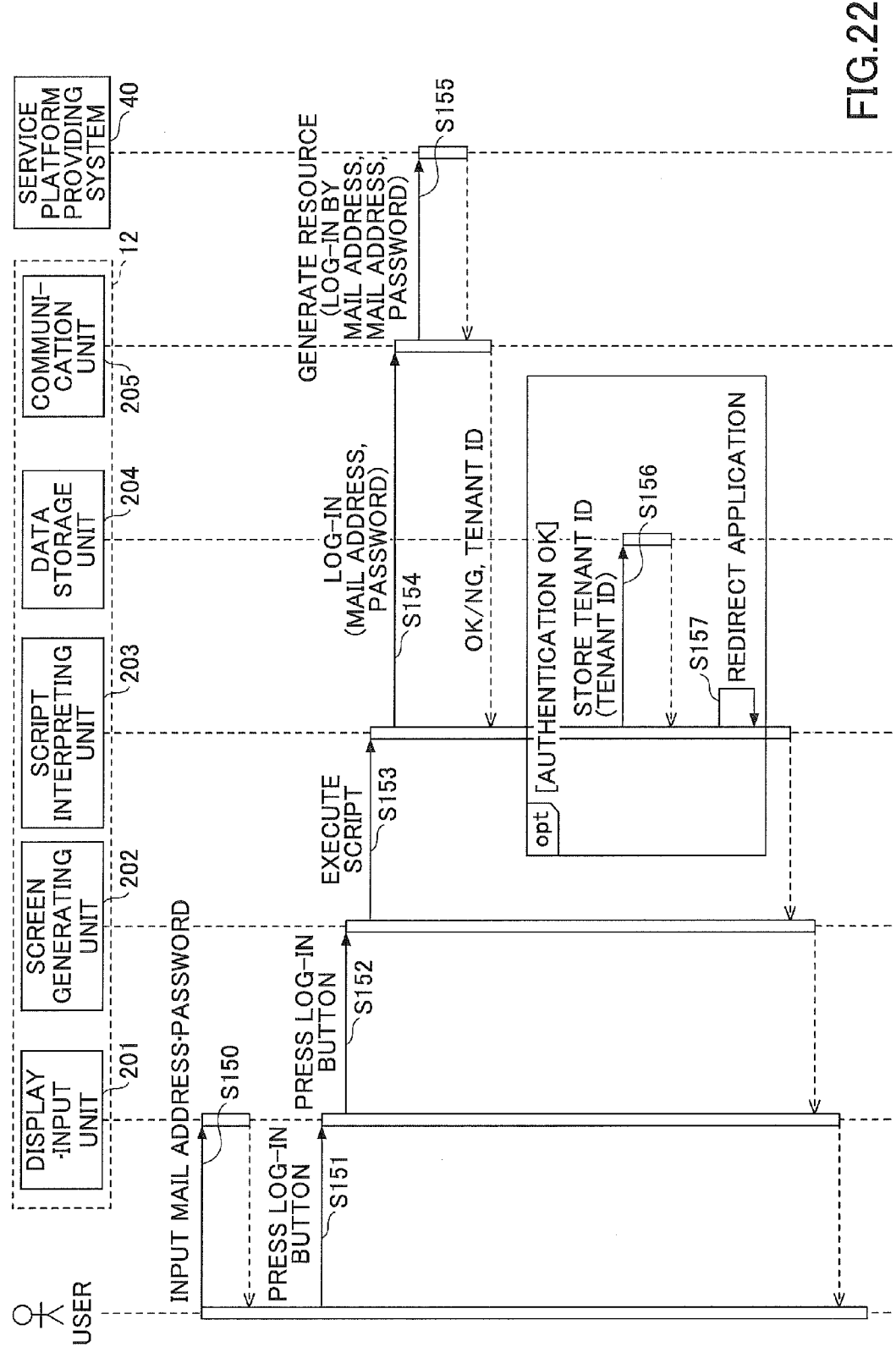
FIG. 22 is a view illustrating an example of a sequence for logging in regardless of tenant ID.

FIG. 22 is a view illustrating an example of a sequence for logging in regardless of the tenant ID. The sequence illustrated in FIG. 22 is performed by the display•input unit 201, the screen generating unit 202, the script interpreting unit 203, the data storage unit 204 and the communication unit 205 of the image forming apparatus 12 and the service platform providing system 40.

As illustrated in FIG. 22, at the image forming apparatus 12, the display•input unit 201 accepts, from a user, an input of the mail address and the password in the log-in screen illustrated in FIG. 11 (S150), and pressing of the log-in button (S151), for example. The screen generating unit 202, upon receiving pressing of the log-in button from the display•input unit 201 (S152), requests the script interpreting unit 203 to execute the script (S153).

The script interpreting unit 203 requests the communication unit 205 to log in by designating the mail address and the password (S154). The service platform providing system 40 receives the request to log in by the mail address in which the mail address and the password are designated as generating a resource via the communication unit 205 of the image forming apparatus 12 (S155).

The service platform providing system 40 authenticates the user using the mail address and the password received in the process of S155, and notifies the authentication result to the image forming apparatus 12. When the user is successfully authenticated, the service platform providing system 40 sends the tenant ID to which the user specified by the mail address and the password belongs with a notification of authentication OK. Further, when the authentication of the user is failed, the service platform providing system 40 sends a notification of authentication NG (error).

The image forming apparatus 12 stores the tenant ID notified from the service platform providing system 40 in the data storage unit 204 (S156). Further, the image forming apparatus 12 redirects the application (service) selected from the application list screen by the user in the process of S10 in FIG. 9 (S157).

As the tenant ID is not designated in the above described sequence when requesting to log in, if the mail address and the password are right in the next request to log in, the user is successfully authenticated. At this time, if a user who belongs to a tenant different from the tenant of the tenant ID currently stored in the image forming apparatus 12 logs-in, a new tenant ID is stored.

(User List stored in Data Storage Unit 204)

In this embodiment, a unit may be provided that deletes periodically or explicitly (by an instruction) the user list stored in the data storage unit 204. By periodically deleting the stored user list as such, an updated user list can be obtained that corresponds to increase, decrease and change of users registered in the service platform providing system 40.

The individual constituents of the data processing system 1 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

A method of simplifying inputting data used for authentication is provided.

Although a preferred embodiment of the data processing system and the data processing method has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

The image forming apparatus 12 is an example of a service using apparatus. The script interpreting unit 203 is an example of an authentication requesting unit, an obtaining unit, a setting unit, a password generating unit and an authentication unit. The display•input unit 201 is an example of an accepting unit or a switching unit. The service platform providing system 40 is an example of a data processing apparatus. The authentication•certification unit 131 is an example of a ticket generating unit and an access control unit.

The present application is based on and claims the benefit of priority of Japanese Priority Application No. 2014-223518 filed on Oct. 31, 2014, the entire contents of which are hereby incorporated by reference.

What is claimed is:

1. A data processing system comprising:
a service using apparatus; and
a data processing apparatus that provides a service to the service using apparatus,
wherein the service using apparatus includes
a processor; and
a memory storing instructions that, when executed, cause the processor to function as;
an authentication requesting unit that requests, based on a request to authenticate from a user accepted via an input screen, the data processing apparatus to authenticate the user by address data and password data input via the input screen,
an obtaining unit that obtains, when the user is successfully authenticated by the data processing apparatus, as association data associated with the address data and the password data, tenant data, a user name of users who belong to a tenant of the tenant data and address data of each of the users, from the data processing apparatus to cause a storage unit to store the association data,
an accepting unit that, when displaying the input screen,
displays, when the association data is stored in the storage unit, a user list using the user name of each of the users in the input screen,
reads out, upon a selection of a user from the displayed user list, the address data corresponding to the selected user name, and
accepts an input of password data by omitting input of the read out address data from the input screen.

2. The data processing system according to claim 1,
wherein the service using apparatus further includes a switch unit that switches, in accordance with a content of a selection by the user in the input screen, a first input screen for inputting the address data and the password data and a second input screen, in which the user list is displayed, for accepting a selection of a user from the displayed user list.

3. The data processing system according to claim 2,
wherein the service using apparatus further includes a setting unit for setting whether to permit usage of the user list, and
wherein the switching unit only uses the first input screen when it is set that the usage of the user list is not permitted by the setting unit.

4. The data processing system according to claim 2,
wherein the accepting unit accepts a request to add an account via the first input screen, and
wherein the data processing apparatus registers address data and password data corresponding to the request to add the account obtained by the accepting unit, and updates the user list.

5. The data processing system according to claim 1,
wherein the service using apparatus includes a password generating unit that generates an apparatus authentication password,
wherein the data processing apparatus further includes
a ticket generating unit that generates an apparatus authentication ticket from the apparatus authentication password generated by the password generating unit, and
an access control unit that controls, using the apparatus authentication ticket generated by the ticket generating unit, access of the obtaining unit to obtain the user list.

6. The data processing system according to claim 1,
wherein the service using apparatus further includes an authentication unit that receives a request to authenticate from a user and authenticates the user, and
wherein the data processing apparatus provides a service to the service using apparatus based on user data of the user who is successfully authenticated by the authentication unit.

7. The data processing system according to claim 1,
wherein the service using apparatus deletes the stored association data periodically or by an instruction.

8. A data processing method performed by a data processing system including
- a service using apparatus, and
- a data processing apparatus that provides a service to the service using apparatus, the method comprising:

performed by the service using apparatus, an authentication request step of requesting, based on a request to authenticate from a user accepted via an input screen, the data processing apparatus to authenticate the user by address data and password data input via the input screen;

an obtaining step of obtaining, when the user is successfully authenticated by the data processing apparatus, as association data associated with the address data and the password data, tenant data, a user name of users who belong to a tenant of the tenant data and address data of each of the users, from the data processing apparatus to cause a storage unit to store the association data; and an accepting step of, when displaying the input screen,
- displaying, when the association data is stored in the storage unit, a user list using the user name of each of the users in the input screen,
- reading out, upon a selection of a user from the displayed user list, the address corresponding to the selected user, and
- accepting an input of password data by omitting input of the read out address data from the input screen.

* * * * *